US012791002B2

(12) United States Patent
Sakamoto et al.

(10) Patent No.: US 12,791,002 B2
(45) Date of Patent: Nov. 10, 2026

(54) WATER WHEEL, HYDRAULIC POWER GENERATION DEVICE, AND HYDRAULIC POWER GENERATION SYSTEM

(71) Applicant: DAIKIN INDUSTRIES, LTD., Osaka (JP)

(72) Inventors: Tomomi Sakamoto, Osaka (JP); Naoki Yamamoto, Osaka (JP); Kaname Maruyama, Osaka (JP); Tomohiro Ishibashi, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 18/896,148

(22) Filed: Sep. 25, 2024

(65) Prior Publication Data

US 2025/0012247 A1 Jan. 9, 2025

Related U.S. Application Data

(63) Continuation of application No. PCT/JP2023/012323, filed on Mar. 27, 2023.

(30) Foreign Application Priority Data

Mar. 30, 2022 (JP) .................................. 2022-05655

(51) Int. Cl.
*F03B 3/12* (2006.01)
*F03B 3/02* (2006.01)
(Continued)

(52) U.S. Cl.
CPC ................ *F03B 3/128* (2013.01); *F03B 3/02* (2013.01); *F03B 3/103* (2013.01); *F03B 3/18* (2013.01);
(Continued)

(58) Field of Classification Search
CPC ............ F03B 3/128; F03B 3/02; F03B 3/103; F03B 3/18; H02K 7/1823; F05B 2220/706; F05B 2230/80; F05B 2240/14; Y02E 10/20
(Continued)

(56) References Cited

U.S. PATENT DOCUMENTS 8,963,356 B2 * 2/2015 Roos ..................... F03B 13/083 290/52
2008/0136191 A1 6/2008 Baarman et al.
2015/0345461 A1 * 12/2015 Kanemoto ................ F03B 3/04 290/52

FOREIGN PATENT DOCUMENTS

JP 2013-96245 A 5/2013
KR 10-1757121 B1 7/2017
WO WO-2013051113 A1 * 4/2013 ................ F03B 3/02

OTHER PUBLICATIONS

International Preliminary Report of corresponding PCT Application No. PCT/JP2023/012323 dated Oct. 10, 2024.
(Continued)

*Primary Examiner* — Charles Reid, Jr.
*Assistant Examiner* — Charles H Reid
(74) *Attorney, Agent, or Firm* — Spencer Fane LLP

(57) ABSTRACT

A water wheel includes a casing to carry a fluid flow through an inside of the casing, a pipe extending in the inside of the casing, a rotor unit having a shaft to be inserted in the inside of the casing, and a support. The shaft is directed toward the pipe. The rotor unit is detachably attached to the casing from outside. The support supports the rotor unit at a predetermined position relative to the pipe when the rotor unit is attached to the casing. A hydraulic power generation device includes the water wheel and a generator driven by the water wheel. A hydraulic power generation system includes the
(Continued)

hydraulic power generation device and a flow path with the hydraulic power generation employed in the flow path.

15 Claims, 17 Drawing Sheets

(51) Int. Cl.
*F03B 3/10* (2006.01)
*F03B 3/18* (2006.01)
*H02K 7/18* (2006.01)

(52) U.S. Cl.
CPC ...... *H02K 7/1823* (2013.01); *F05B 2220/706* (2013.01)

(58) Field of Classification Search
USPC ..................................................... 290/43, 54
See application file for complete search history.

(56) References Cited

OTHER PUBLICATIONS

European Search Report of corresponding EP Application No. 23 78 0413.3 dated Jun. 11, 2025.
International Search Report of corresponding PCT Application No. PCT/JP2023/012323 dated May 16, 2023.

* cited by examiner

WATER WHEEL, HYDRAULIC POWER GENERATION DEVICE, AND HYDRAULIC POWER GENERATION SYSTEM

CROSS-REFERENCE TO RELATED APPLICATIONS

This is a continuation of International Application No. PCT/JP2023/012323 filed on Mar. 27, 2023, which claims priority to Japanese Patent Application No. 2022-056555, filed on Mar. 30, 2022. The entire disclosures of these applications are incorporated by reference herein.

BACKGROUND

Technical Field

The present disclosure relates to a water wheel, a hydraulic power generation device, and a hydraulic power generation system.

Background Art

WO 2013/051113 discloses a Francis water wheel for hydraulic power generation. This water wheel includes a pipelike casing. The casing has one end to which a conduit is connected. The casing has the other end blocked by a blocking plate. The blocking plate allows a water wheel main shaft to pass therethrough. The water wheel main shaft has one end to which a runner is fixed. The runner is disposed inside the casing. A guide vane is provided on the outer periphery of the runner. The runner and the guide vane are housed in a runner cover. The runner cover guides running water from the conduit to the runner via the guide vane. The runner cover has one end to which a draft bend is connected. The running water guided to the runner rotates the runner, and is then discharged to the downstream through the draft bend.

SUMMARY

A first aspect of the present disclosure is directed to a water wheel. The water wheel according to the first aspect includes a casing configured to carry a fluid flow through an inside thereof, a pipe extending in the inside of the casing, a rotor unit having a shaft configured to be inserted in the inside of the casing, and a support. The shaft is directed toward the pipe. The rotor unit is detachably attached to the casing from outside. The support is configured to support the rotor unit at a predetermined position relative to the pipe when the rotor unit is attached to the casing.

DETAILED DESCRIPTION OF EMBODIMENT(S)

Figure 1:
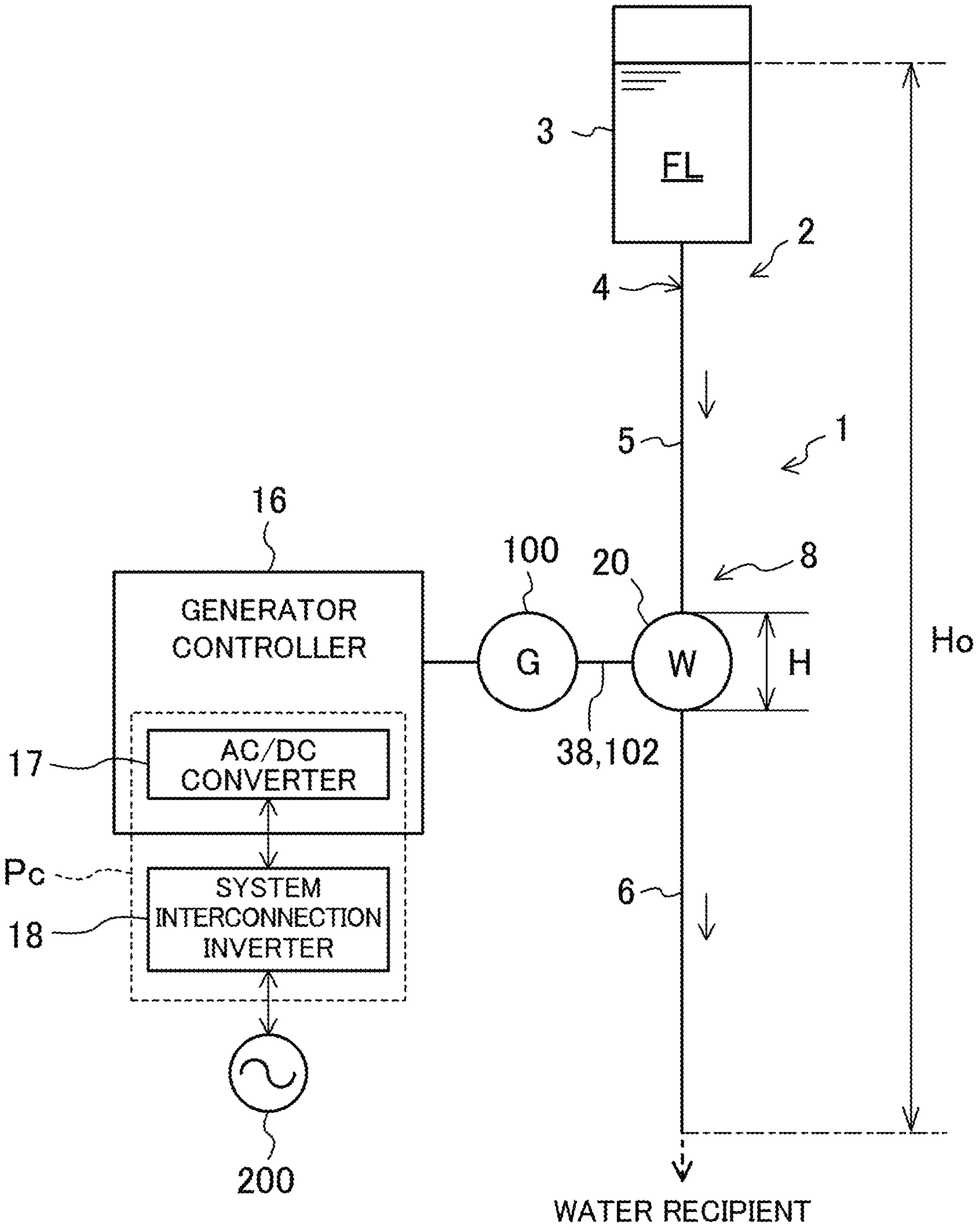
FIG. 1 is a diagram illustrating a schematic configuration of a hydraulic power generation system according to an embodiment.

Illustrative embodiments will be described below in detail with reference to the drawings. The drawings are used for conceptual description of the technique of the present disclosure. In the drawings, dimensions, ratios, or numbers may be exaggerated or simplified for easier understanding of the technique of the present disclosure.

Embodiment

In this embodiment, examples of the technique of the present disclosure will be described which are applied to an in-line water wheel, and a vertically mounted hydraulic power generation device and a hydraulic power generation system which include the in-line water wheel.

A hydraulic power generation system (1) shown in FIG. 1 is applied to a water supply system (2), for example. The hydraulic power generation system (1) of this example is applied to a terminal side of the water supply system (2). Water (fluid) (FL) flowing through the hydraulic power generation system (1) is supplied to houses, buildings, and a distributing reservoir, for example.

The water supply system (2) includes a water distribution tank (3) and a flow path (4). The flow path (4) constitutes a pipeline between the water distribution tank (3) and a water recipient such as a house. The water distribution tank (3) allows water (FL) to flow into the flow path (4) (a first flow path (5)). The flow path (4) is a channel through which water (FL) flows with a head.

The flow path (4) includes the first flow path (5) and a second flow path (6). The first flow path (5) is located on the upstream side (the inlet side) of a water wheel (20). The first flow path (5) connects the water distribution tank (3) and the water wheel (20). The second flow path (6) is located on the downstream side (the outlet side) of the water wheel (20). The second flow path (6) connects the water wheel (20) and the water recipient.

Hydraulic Power Generation System

As illustrated in FIG. 1, the hydraulic power generation system (1) includes the flow path (4), a hydraulic power generation device (8), a generator controller (16), and a system interconnection inverter (18). The flow path (4) is, for example, a pipeline constituting the water supply system (2). The water (FL) as a fluid flows through the flow path (4).

The hydraulic power generation device (8) of this example is used for the flow path (4) constituting the water supply system (2). The hydraulic power generation device (8) constitutes a small-scale power generation facility. The hydraulic power generation device (8) recovers head energy of the water (FL) as electric power. The hydraulic power generation device (8) may be installed instead of a decompression valve provided to decompress water (FL) in a water purification plant or any other similar facilities.

The hydraulic power generation device (8) includes the water wheel (20) and a generator (100).

The water wheel (20) is arranged in the middle of the flow path (4). The water wheel (20) converts energy of water (FL) into rotational energy. Water (FL) flowing through the flow path (4) rotates the water wheel (20). Thus, the water wheel (20) rotates shafts (38, 102). The generator (100) is connected to the water wheel (20) through the shafts (38, 102). The generator (100) includes a rotor and a stator. The rotor is configured to include embedded permanent magnets. The stator has a coil.

The generator (100) is driven by the water wheel (20). When driven by the water wheel (20), the generator (100) operates in a regenerative mode. The generator (100) operating in the regenerative mode receives the rotational energy conveyed from the shaft (38) and generates electric power. The power generated by the generator (100) is supplied to an electric power system (200) via a power circuit (Pc). The electric power system (200) is, for example, a commercial power source.

The power circuit (Pc) is configured to be able to feed the power of the electric power system (200) to the generator (100). Receiving the power of the electric power system (200) through the power circuit (Pc), the generator (100) operates in a power running mode. The generator (100) operating in the power running mode functions as a motor for rotating the water wheel (20). For example, the water wheel (20) rotates in the same direction in the power running mode and the regenerative mode.

The generator controller (16) controls the generator (100). The generator controller (16) includes a microcomputer and a memory device. The memory device stores various programs and data. The microcomputer executes the programs read from the memory device.

The generator controller (16) includes an AC/DC converter (17). The AC/DC converter (17) and the system interconnection inverter (18) form the power circuit (Pc). The power circuit (Pc) is configured to supply power bidirectionally between the generator (100) and the electric power system (200).

The AC/DC converter (17) is configured to be able to convert power bidirectionally. The AC/DC converter (17) converts AC power generated by the generator (100) into DC power. The AC/DC converter (17) outputs the converted DC power to the system interconnection inverter (18). The AC/DC converter (17) converts DC power outputted from the system interconnection inverter (18) into AC power. The AC/DC converter (17) outputs the converted AC power to the generator (100).

The system interconnection inverter (18) is configured to be able to convert power bidirectionally. The system interconnection inverter (18) converts DC power outputted from the AC/DC converter (17) into AC power. The system interconnection inverter (18) supplies the converted AC power to the electric power system (200). The system interconnection inverter (18) converts the AC power supplied from the electric power system (200) into DC power. The system interconnection inverter (18) outputs the converted DC power to the AC/DC converter (17).

The generator controller (16) may control the torque or the number of rotations of the generator (100). Thus, the flow rate (Q) or effective head (H) of water (FL) flowing through the water wheel (20) may be adjusted in the hydraulic power generation system (1). The effective head (H) is a value obtained by subtracting a head corresponding to a flow path resistance, a pressure loss of a motor-operated valve (10), and the water pressure on the downstream side of the water wheel (20) from a total head (Ho). The total head (Ho) is a difference in elevation from the surface of water in the water distribution tank (3) to the outlet end of the flow path (4). The flow path resistance corresponds to the resistance of the pipeline.

The generator controller (16) may control the generator (100) based on the pressure of water (FL) on the upstream or downstream side of the water wheel (20). The generator controller (16) may control the generator (100) based on the flow rate of water (FL) on the upstream or downstream side of the water wheel (20). The generator controller (16) may control the generator (100) based on the power output generated by the generator (100). The hydraulic power generation system (1) may include sensors (a flow rate sensor and a pressure sensor), motor-operated valves, and other components required by the generator controller (16) in controlling the generator (100), at appropriate positions in the flow path (4).

Hydraulic Power Generation Device

Figure 2:
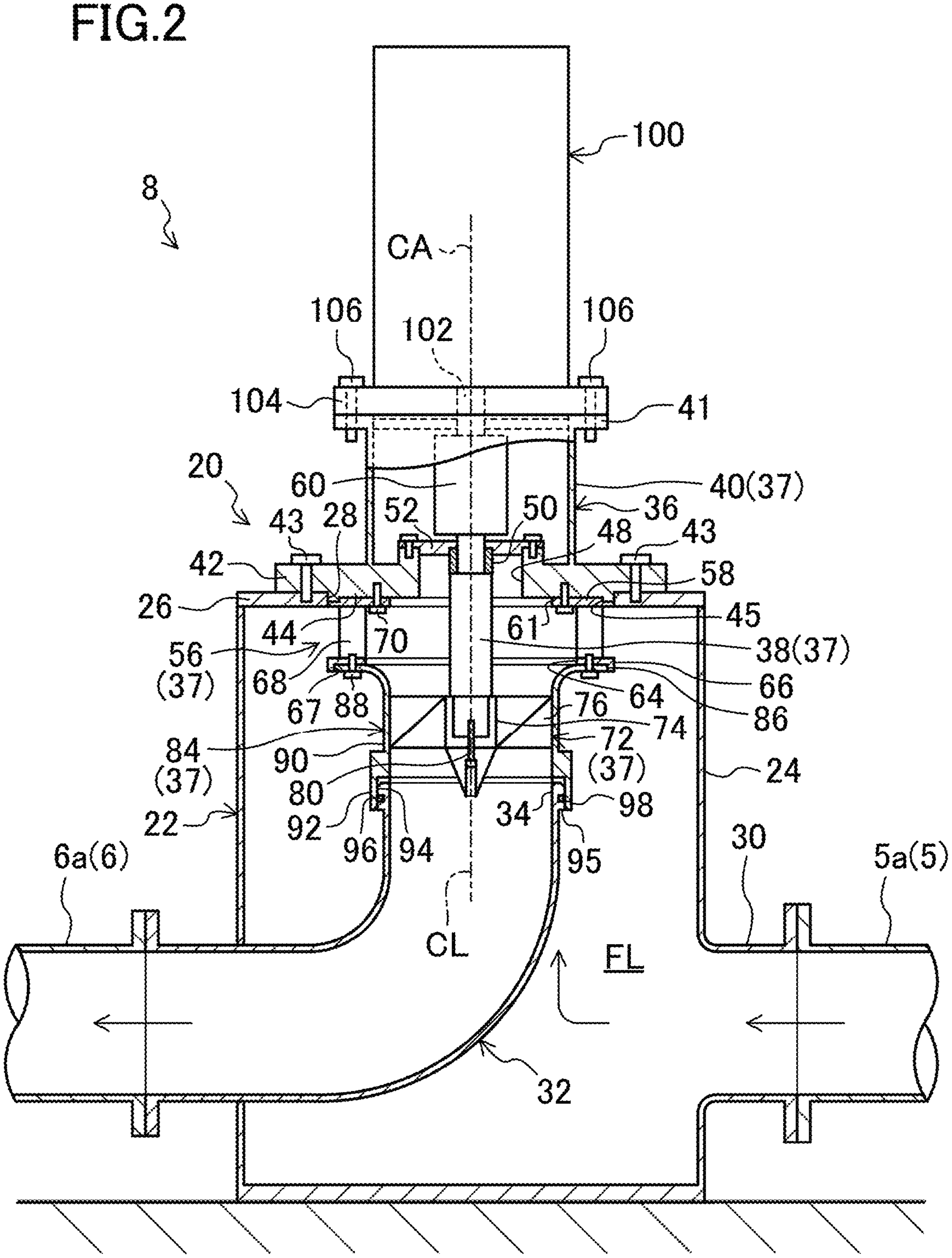
FIG. 2 is a cross-sectional view illustrating a schematic configuration of a hydraulic power generation device according to the embodiment.
Figure 3:
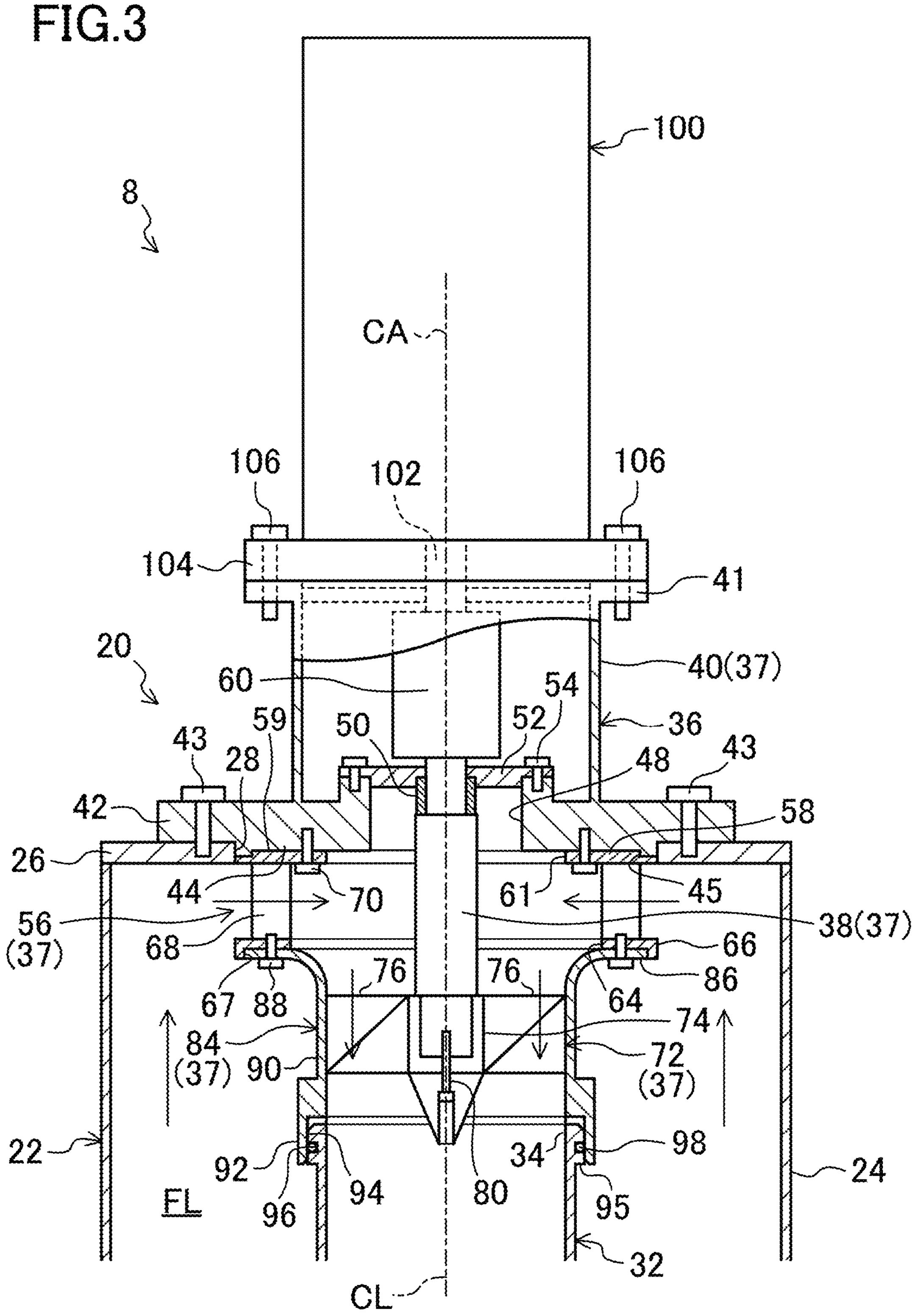
FIG. 3 is a cross-sectional view illustrating an essential portion of the hydraulic power generation device according to the embodiment.

As illustrated in FIGS. 2 and 3, the hydraulic power generation device (8) is vertically mounted such that the water wheel (20) and the generator (100) are arranged in a vertical direction. The generator (100) is disposed above the water wheel (20). The generator (100) is disposed so that its shaft (102) extends in the vertical direction.

The shaft (102) of the generator (100) is aligned with the shaft (38) of the water wheel (20). A lower end portion of the shaft (102) of the generator (100) and an upper end portion of the shaft (38) of the water wheel (20) are coupled to each other through a coupling or through an intermediate bearing (60). The coupling and the intermediate bearing (60) have a structure that enables positioning of the shafts (38, 102) in a rotor unit (36).

The lower end of the generator (100) is provided with a lower flange (104). The lower flange (104) of the generator (100) is fastened to an upper flange (41) provided at the upper end of a frame (40) of the water wheel (20) with a plurality of connecting bolts (106). Thus, the generator (100) is fixed to the rotor unit (36) of the water wheel (20). Each of the connecting bolts (106) connects the flanges (41, 104) to each other from above the lower flange (104) of the generator (100).

Water Wheel

The water wheel (20) is a Francis water wheel. The water wheel (20) includes a casing (22), an inflow pipe (30), an outflow pipe (32), and the rotor unit (36).

The casing (22) has a cylindrical shape. The casing (22) is installed in an upright position with its centerline extending in the vertical direction. The casing (22) includes a casing body (24) in the shape of a bottomed cylinder and an upper-end plate (26). The upper-end plate (26) closes the upper opening of the casing body (24). The upper-end plate (26) is joined to the upper end of the casing body (24). The upper-end plate (26) constitutes an attachment portion to which the rotor unit (36) is attached. The upper-end plate (26) has an attachment portion opening (28).

The inflow pipe (30) and the outflow pipe (32) are connected to opposite sides of the peripheral wall of the casing (22). The inflow pipe (30) and the outflow pipe (32) extend in the horizontal direction. A water supply pipe (5_a_) is connected to the inflow pipe (30). The water supply pipe (5_a_) constitutes the first flow path (5). Although not shown, the inflow pipe (30) and the water supply pipe (5_a_) are fastened to each other using bolts and nuts. A water discharge pipe (6_a_) is connected to the outflow pipe (32). Although not shown, the outflow pipe (32) and the water discharge pipe (6_a_) are fastened to each other using bolts and nuts.

The water wheel (20) is configured as an in-line water wheel, in which an inflow path for water (FL) defined by the water supply pipe (5_a_) and the inflow pipe (30) and an outflow path for water (FL) defined by the outflow pipe (32) and the water discharge pipe (6_a_) are aligned with each other. The outflow pipe (32) passes through the casing (22) and extends into the casing (22). The outflow pipe (32) is an example of a pipe. The outflow pipe (32) is curved in the casing (22) to extend from near the peripheral wall of the casing (22) toward the upper-end plate (26).

The open end of the outflow pipe (32) located in the casing (22) faces the attachment portion opening (28) of the casing (22). This open end constitutes an inflow end (34) of the inflow pipe (32) serving as an inflow port for water (FL). Water (FL) flowing through the water supply pipe (5_a_) and the inflow pipe (30) flows into the casing (22). The water (FL) flows through the inside of the casing (22). The water (FL) flowing through the inside of the casing (22) flows into the outflow pipe (32) from the inflow end (34) and passes through the outflow pipe (32) to flow out into the water discharge pipe (6_a_).

The rotor unit (36) is a rotating part including the shaft (38) of the water wheel (20). The rotor unit (36) is attached to an upper portion of the casing (22) with the shaft (38) extending in the vertical direction. The rotor unit (36) is detachably attached to the casing (22) from the outside. In the attachment structure to the casing (22), the rotor unit (36) is not fastened from the inside of the casing (22).

The rotor unit (36) is configured as a combination of a plurality of components (37) including the shaft (38). The rotor unit (36) of this example includes the shaft (38), the frame (40), a guide vane (56), a runner (72), and a runner cover (84) as the components (37).

The shaft (38) is inserted in the casing (22) through the attachment portion opening (28). The shaft (38) is directed toward the inflow end (34) of the outflow pipe (32). The frame (40) is placed on the upper-end plate (26). Together with the shaft (38) of the rotor unit (36), the shaft (102) of the generator (100) is housed in a center portion of the frame (40). The shaft (38) of the generator (100) and the shaft (38) of the rotor unit (36) are coupled to each other inside the frame (40).

A lower end portion of the frame (40) is provided with a lower flange (42). The lower flange (42) of the frame (40) is fastened to the upper-end plate (26) of the casing (22) with connecting bolts (43). The connecting bolts (43) couple the lower flange (42) and the upper-end plate (26) to each other from above the lower flange (42) of the frame (40). The lower end portion of the frame (40) has a protruding portion (44). The protruding portion (44) is located in the attachment portion opening (28) of the upper-end plate (26).

A sealing member (not shown) is interposed between the lower flange (42) of the frame (40) and the upper-end plate (26) around the attachment portion opening (28). The sealing member is, for example, an O-ring. Watertightness is thus ensured at the joint portion between the casing (22) and the frame (40). The lower end portion of the frame (40) has a circular lower opening (48) at the center. The shaft (38) is inserted in the lower opening (48) of the frame (40).

A portion of the shaft (38) located in the lower opening (48) of the frame (40) is provided with a mechanical seal (50). The mechanical seal (50) reduces water leakage from the shaft (38). The mechanical seal (50) is provided with an integrally formed seal cover (52). The seal cover (52) closes the lower opening (48) of the frame (40) around the shaft (38). An outer peripheral portion of the seal cover (52) is fastened to an edge portion of the lower opening (48) of the frame (40) with a plurality of connecting bolts (54).

The guide vane (56) is provided at a lower portion of the frame (40). The guide vane (56) is placed opposite to the outflow pipe (32) with respect to the runner cover (84). The guide vane (56) guides water (FL) flowing through the inside of the casing (22) to the runner (72). The guide vane (56) is fixed (immobile), for example. The fixed guide vane (56) is low in initial cost and has fewer malfunctions because of the absence of a movable part, requiring low running cost.

The guide vane (56) includes a disk-shaped base plate (58), an annular plate (66), and a plurality of blades (68). The base plate (58) and the annular plate (66) face each other in the up-and-down direction. The plurality of blades (68) are provided upright between the base plate (58) and the annular plate (66). The blades (68) are arranged at equal intervals in the circumferential direction of the guide vane (56). The blades (68) are fixed to the base plate (58) and the annular plate (66).

The base plate (58) is fastened to the lower surface of the protruding portion (44) of the frame (40), which is fitted into the attachment portion opening (28), with a plurality of connecting bolts (70). The connecting bolts (70) couple the base plate (58) and the frame (40) to each other from below the base plate (58). The lower surface of the protruding portion (44) of the frame (40) has a fitting recess (45). The upper surface of the base plate (58) has a fitting protrusion (59).

The base plate (58) and the frame (40) are aligned with each other by a spigot structure. The spigot structure is a structure that makes the fitting recess (45) of the frame (40) and the fitting protrusion (59) of the base plate (58) fitted to each other to a state in which the inner peripheral surface of the fitting recess (45) and the outer peripheral surface of the fitting protrusion (59) are butted together. The base plate (58) has an insertion hole (61) at a portion corresponding to the lower opening (48) of the frame (40). The shaft (38) is inserted in the insertion hole (61). The shaft (38) is inserted in an inner opening (64) of the annular plate (66) as well.

The guide vane (56) gives prewhirl to water (FL) flowing therein from the outer peripheral side, by the plurality of blades (68). The runner cover (84) and the guide vane (56) are attachable and detachable, as a single unit, to and from the rotor unit (36) detached from the casing (22) without detaching any other components (37) of the rotor unit (36). Thus, the inner opening (64) of the annular plate (66) is designed to have a diameter that is greater than the diameter of the runner (72) so that the runner (72) can pass therethrough.

The runner (72) is fixed to a portion of the shaft (38) located inside the casing (22). The runner (72) of this example is fixed to the lower end portion of the shaft (38). The runner (72) is disposed between the inflow end (34) of the outflow pipe (32) and the guide vane (56). The runner (72) is of an axial-flow type. A boss (74) serving as a center portion of the runner (72) is fastened to the lower end portion of the shaft (38) with a connecting bolt (80). The connecting bolt (80) couples the boss (74) to the lower end portion of the shaft (38) from below the runner (72). Although not shown, the runner (72) and the shaft (38) are fastened to each other by key fastening or friction fastening, for example.

The runner (72) receives a flow of water (FL) on the blades (76) provided around the boss (74), which causes the runner (72) to rotate about the shaft (38). The runner (72) is attachable to and detachable from the rotor unit (36) detached from the casing (22) without detaching any other components (37) of the rotor unit (36). Thus, the runner cover (84) is designed to have an inside diameter that is greater than the diameter of the runner (72) so that the runner (72) can pass therethrough along its entire length.

The runner cover (84) is located on the outer periphery of the runner (72). The runner cover (84) is formed into a cylindrical shape surrounding the outer periphery of the runner (72). The runner cover (84) houses the runner (72) rotatably. A predetermined gap is formed between the inner peripheral surface of the runner cover (84) and the runner (72) (strictly speaking, the blades (76)). In order for the water wheel (20) to exhibit and maintain predetermined performance, it is important to assemble the water wheel (20) as designed so that this gap has a predetermined width. For this purpose, the rotor unit (36) of this example has a structure that allows positioning of the generator (100), the frame (40), the coupling or the intermediate bearing (60), the guide vane (56), and the runner cover (84) relative to one another during assembly.

The upper end of the runner cover (84) is provided with an upper flange (86). The upper flange (86) extends so as to spread like a skirt toward the outer periphery of the runner cover (84). The upper flange (86) of the runner cover (84) is fastened to the annular plate (66) of the guide vane (56) with a plurality of connecting bolts (88). The connecting bolts (88) couple the upper flange (86) of the runner cover (84) and the annular plate (66) of the guide vane (56) to each other from below the upper flange (86). Thus, the runner cover (84) is fixed to the guide vane (56). The lower surface of the annular plate (66) of the guide vane (56) has a fitting recess (67).

The upper flange (86) of the runner cover (84) is fitted into the fitting recess (67) of the annular plate (66). The annular plate (66) of the guide vane (56) and the runner cover (84) are aligned with each other by a spigot structure. The spigot structure is a structure that makes the fitting recess (67) of the annular plate (66) and the upper flange (86) of the runner cover (84) fitted to each other to a state in which the inner peripheral surface of the fitting recess (67) and the outer peripheral surface of the upper flange (86) are butted together.

The runner cover (84) guides water (FL) flowing through the inside of the casing (22) to the runner (72) via the guide vane (56). The runner cover (84) is attachable to and detachable from the rotor unit (36) detached from the casing (22) without detaching any other components (37) of the rotor unit (36). Thus, the runner cover (84) is fixed to the guide vane (56) only by the fastening with the connecting bolts (88). The runner cover (84) is not welded to any other components (37) of the rotor unit (36).

The rotor unit (36) is attached to the casing (22) by inserting the guide vane (56), the runner (72), and the runner cover (84) into the casing (22) through the attachment portion opening (28), and coupling the lower flange (42) of the frame (40) and the upper-end plate (26) to each other with the connecting bolts (43) while the lower flange (42) of the frame (40) is applied to the upper-end plate (26). The water wheel (20) includes a support (90) configured to support the rotor unit (36).

The support (90) supports the rotor unit (36) at a predetermined position relative to the outflow pipe (32) when the rotor unit (36) is attached to the casing (22). In the water wheel (20) of this example, the runner cover (84) functions as the support (90). In this example, the centerline (CL) of the outflow pipe (32) at the inflow end (34) and the axis (CA) of the shaft (38) coincide with each other so as not to block a flow of water (FL). The runner cover (84) and the outflow pipe (32) are butted together and fitted to each other. The lower end of the runner cover (84) is provided with an extension piece (92). The extension piece (92) of this example has a cylindrical shape. The inside diameter and outside diameter of the extension piece (92) are slightly greater than the inside diameter and outside diameter of the body portion of the runner cover (84), respectively.

The runner cover (84) has a fitting recess (94) on the inner surface of the extension piece (92). The inflow end (34) of the outflow pipe (32) is fitted into the fitting recess (94). The inflow end (34) of the outflow pipe (32) is provided with a fitting protrusion (95). The fitting protrusion (95) is a portion protruding outward from the periphery of the outflow pipe (32). The inflow end (34) of the outflow pipe (32) and the runner cover (84) are aligned with each other by a spigot structure. The spigot structure is a structure that makes the fitting recess (94) and the fitting protrusion (95) fitted to each other to a state in which the inner peripheral surface of the fitting recess (94) and the outer peripheral surface of the fitting protrusion (95) are butted together.

The fitting protrusion (95) of the outflow pipe (32) has a seal groove (96). The seal groove (96) extends around the entire periphery of the fitting protrusion (95). The opening of the seal groove (96) faces toward the outer periphery of the fitting protrusion (95). A sealing member (98) is fitted into the seal groove (96). The sealing member (98) is attached to the inflow end (34) of the outflow pipe (32) in this manner. The sealing member (98) is, for example, an O-ring. When the fitting protrusion (95) of the outflow pipe (32) is fitted into the fitting recess (94), the extension piece (92) of the runner cover (84) covers the sealing member (98) as well as the opening of the seal groove (96).

The sealing member (98) is interposed between the extension piece (92) of the runner cover (84) and the fitting protrusion (95) of the outflow pipe (32). The sealing member (98) is squeezed between the extension piece (92) of the runner cover (84) and the inner surface of the seal groove (96). As described, the sealing member (98) is provided at a portion where the runner cover (84) and the outflow pipe (32) are fitted to each other. Thus, the sealing member (98) hermetically seals the gap between the runner cover (84) and the outflow pipe (32). The runner cover (84) is supported by the outflow pipe (32) by putting the extension piece (92) over the inflow end (34) of the outflow pipe (32) to cause the fitting protrusion (95) to be fitted to the fitting recess (94).

In the water wheel (20) of the above configuration, water (FL) flowing through the first flow path (5) flows through the water supply pipe (5*a*), passes through the inflow pipe (30), and flows into the casing (22). The water (FL) that has flowed into the casing (22) flows upward between the inner peripheral surface of the casing (22) and the outer peripheral surface of the outflow pipe (32), and then flows into the guide vane (56) from the outer periphery side. At this time, prewhirl is given to the water (FL) flowing from the guide vane (56) toward the runner (72). The water (FL) given the prewhirl flows through the runner (72) and flows into the outflow pipe (32). When the generator (100) is operating in the regenerative mode, the runner (72) rotates due to the pressure of the water (FL) passing the runner (72). When the generator (100) is operating in the power running mode, the runner (72) functions as a motor and rotates to feed the water (FL) to the outflow pipe (32). The water (FL) that has flowed into the outflow pipe (32) flows into the second flow path (6) from the water discharge pipe (6*a*).

The water wheel (20) requires maintenance. For example, if flow regimes (the flow rate (Q) of water and the total head (Ho)) at the installation site of the water wheel (20) change from the initial design conditions, the guide vane (56) is replaced intentionally to accord with the changes in the flow regimes. However, in some cases it may be impossible to deal with the changes in the flow regimes by simply changing the shape of the guide vane (56). Thus, the runner (72) may be replaced together with the guide vane (56). It may be also necessary to replace other components (37) of the water wheel (20), such as the runner cover (84) forming part of the rotor unit (36), due to failures or others.

Figure 4:
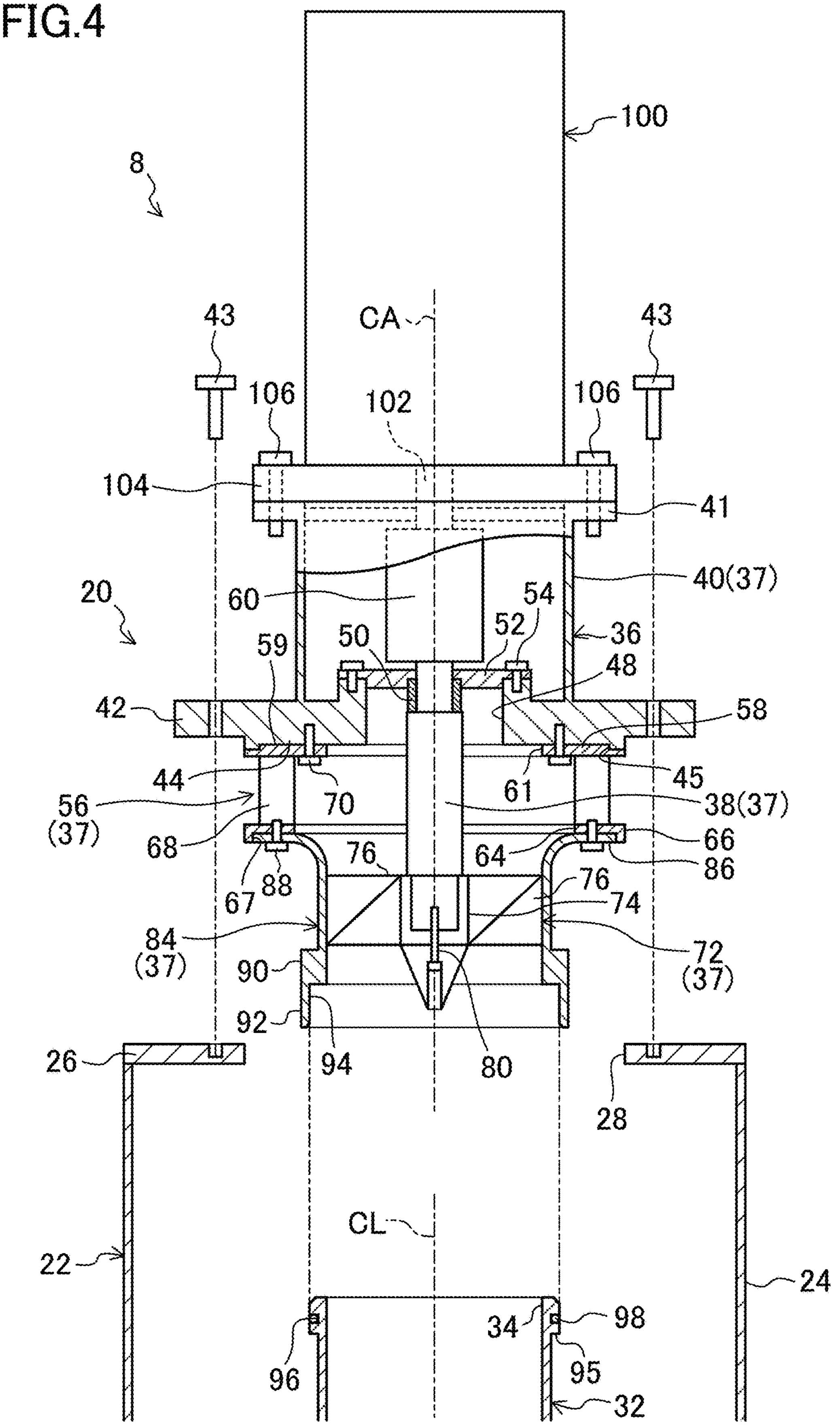
FIG. 4 is a cross-sectional view illustrating the hydraulic power generation device according to the embodiment, in a state in which a rotor unit is detached from a casing.

In the maintenance of the water wheel (20), as illustrated in FIG. 4, the connecting bolts (43) that connect the frame (40) of the rotor unit (36) to the upper-end plate (26) of the casing (22) are unfastened to detach the rotor unit (36) from the casing (22) together with the generator (100). At this moment, the outflow pipe (32) and the runner cover (84), which are fitted to each other by the spigot structure, are disconnected by lifting of the rotor unit (36).

A maintenance operator replaces the component (37) targeted for replacement in the rotor unit (36) detached from the casing (22). Then, the rotor unit (36) after the replacement of the component (37) is inserted in the casing (22) through the attachment portion opening (28), and is attached again to the casing (22) with the connecting bolts (43). At this time, the outflow pipe (32) and the runner cover (84) are aligned and connected to each other by simply putting the extension piece (92) of the runner cover (84) over the inflow end (34) of the outflow pipe (32) to cause the fitting protrusion (95) to be fitted to the fitting recess (94).

Figure 5:
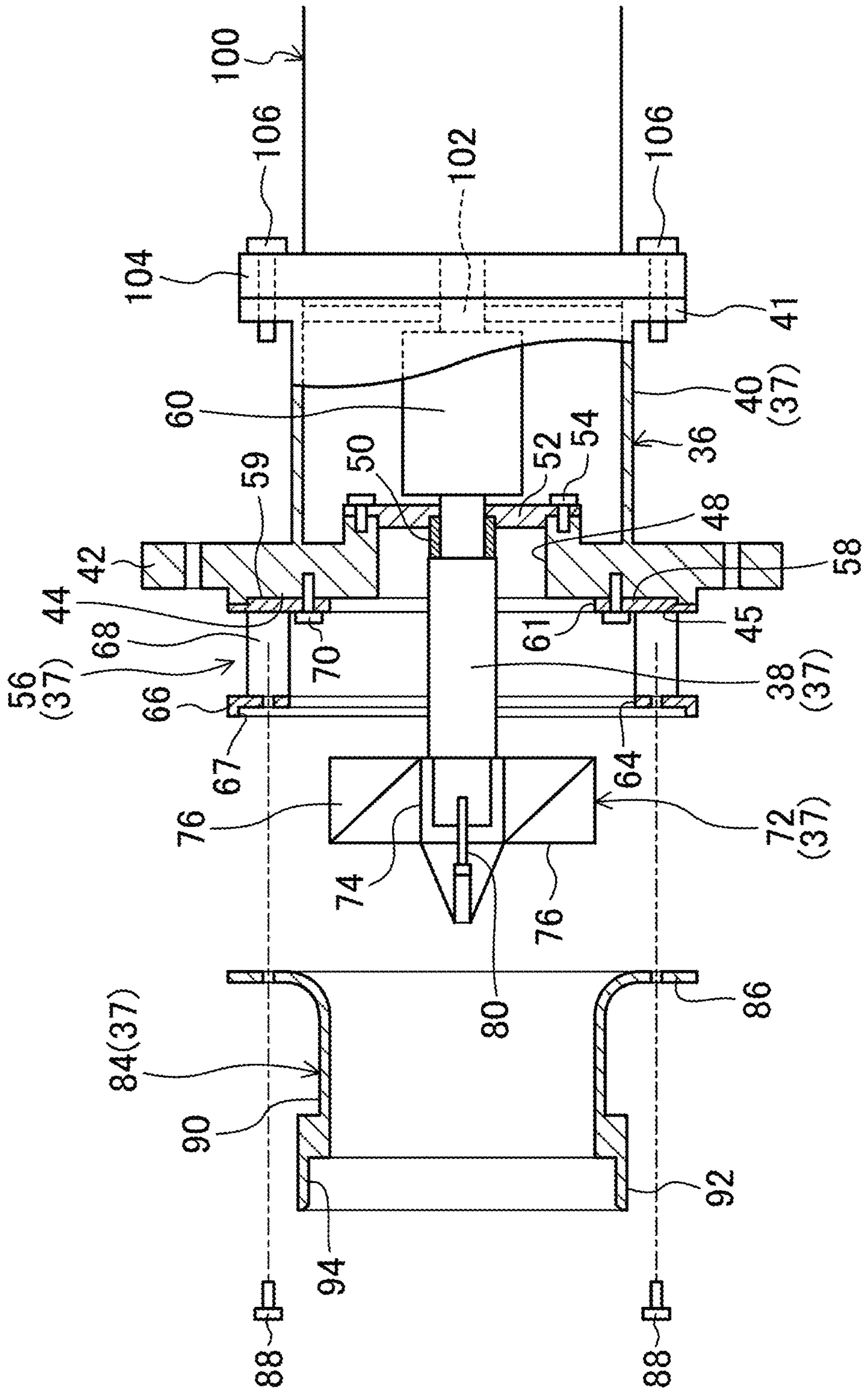
FIG. 5 is a cross-sectional view illustrating the hydraulic power generation device according to the embodiment, in a disassembled state in which a runner cover is detached from the rotor unit.

In order to replace the runner cover (84) in the rotor unit (36) detached from the casing (22), the connecting bolts (88) that connect the runner cover (84) to the guide vane (56) are unfastened to detach the runner cover (84) from the rotor unit (36) as illustrated in FIG. 5. Then, a substitute runner cover (84) is attached to the guide vane (56) with the connecting bolts (88) in a similar manner.

Figure 6:
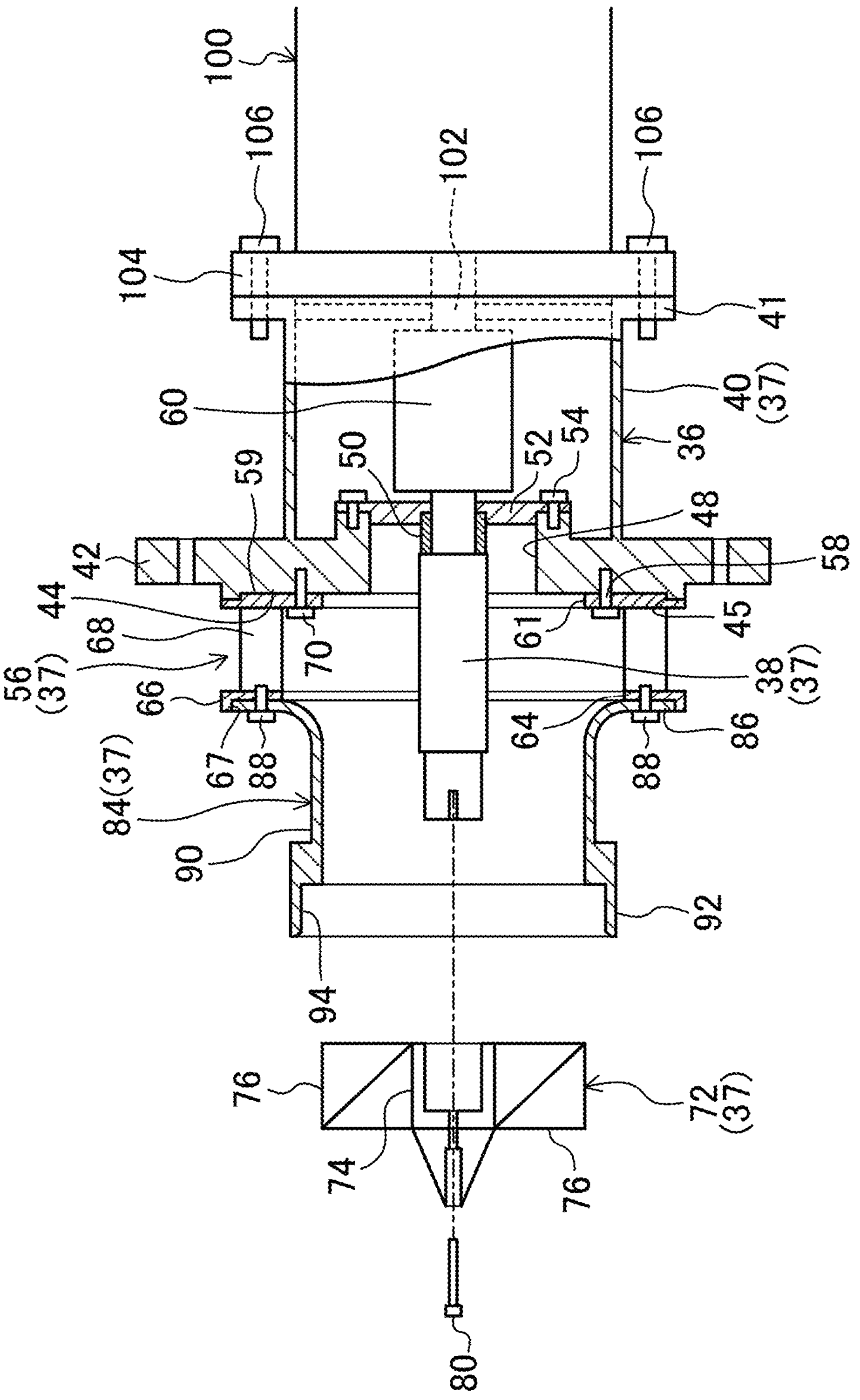
FIG. 6 is a cross-sectional view illustrating the hydraulic power generation device according to the embodiment, in a disassembled state in which a runner is detached from the rotor unit.

In order to replace the runner (72) in the rotor unit (36) detached from the casing (22), the connecting bolt (80) that connects the runner (72) to the shaft (38) is unfastened to detach the runner (72) from the shaft (38) as illustrated in FIG. 6. Then, a substitute runner (72) is attached to the shaft (38) with the connecting bolt (80) in a similar manner.

Figure 7:
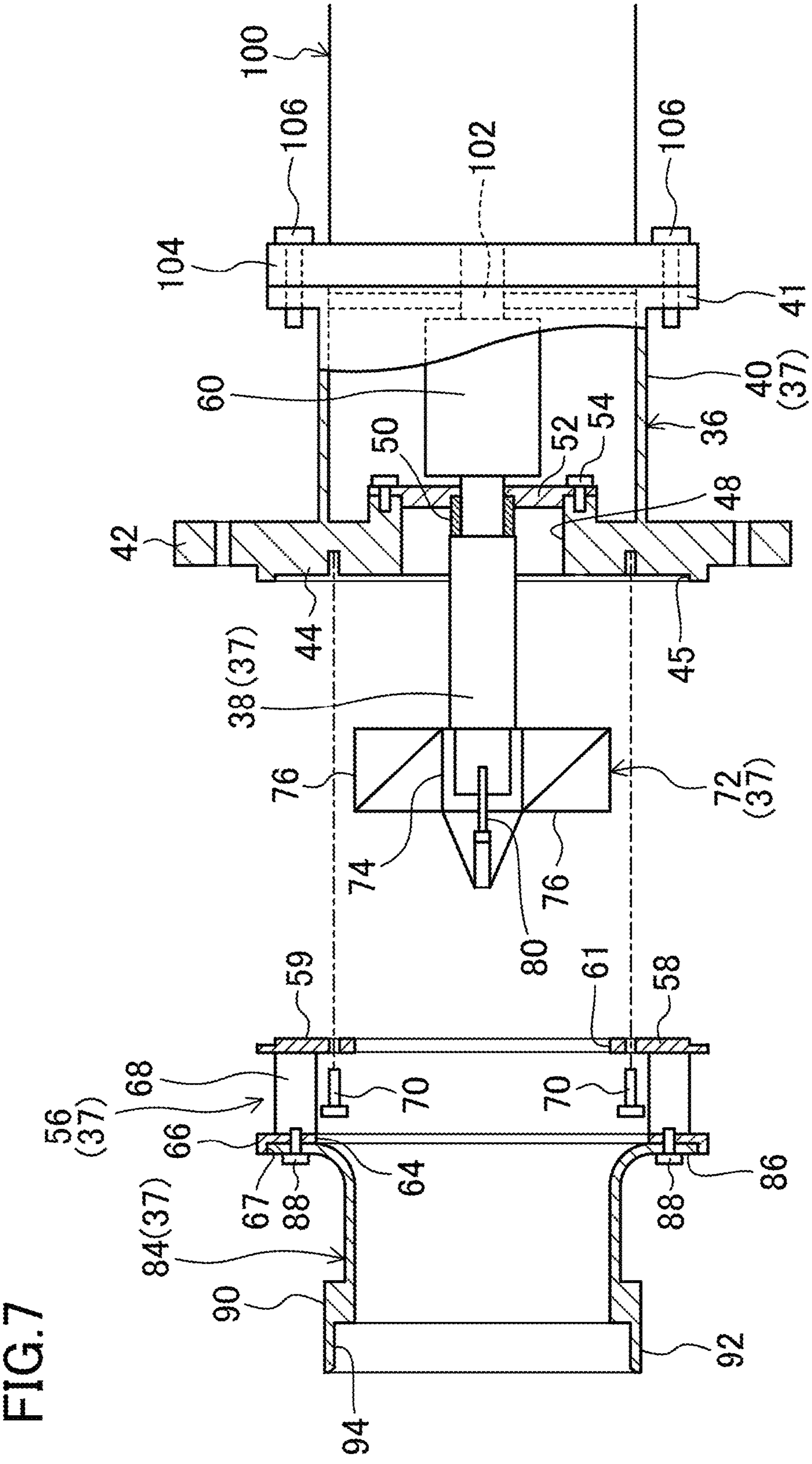
FIG. 7 is a cross-sectional view illustrating the hydraulic power generation device according to the embodiment, in a disassembled state in which the runner cover and a guide vane are detached together from the rotor unit.

In order to replace the guide vane (56) in the rotor unit (36) detached from the casing (22), the connecting bolts (70) that connect the guide vane (56) to the frame (40) are unfastened to detach the guide vane (56) and the runner cover (84) together from the rotor unit (36) as illustrated in FIG. 7. Then, a substitute guide vane (56) is attached to the frame (40) with the connecting bolts (70) in a similar manner.

The guide vane (56) may be replaced together with the runner cover (84). In other words, the guide vane (56) and the runner cover (84) coupled as a whole unit may be replaced. Alternatively, only the guide vane (56) may be replaced by unfastening the connecting bolts (88) that connect the runner cover (84) to the guide vane (56) to disassemble the runner cover (84) and the guide vane (56) from each other, and then attaching a substitute guide vane (56) to the same runner cover (84) that has been used, with the connecting bolts (88) in a similar manner.

Features of Embodiment

In the water wheel (20) of this embodiment, the rotor unit (36) is attachable and detachable from the outside of the casing (22). The rotor unit (36) can be detached from the outside of the casing (22) for replacement of a component (37) of the rotor unit (36). Replacement work for the component (37) can be carried out on the rotor unit (36) detached from the casing (22). Further, the water wheel (20) includes the support (90). The support (90) supports the rotor unit (36) at a predetermined position relative to the outflow pipe (32) when the rotor unit (36) is attached to the casing (22). This makes it possible to align the rotor unit (36) with the outflow pipe (32). Accordingly, there is no need to fasten the rotor unit (36) and the outflow pipe (32) to each other inside the casing (22) with a fastener. It is thus possible to replace the component (37) of the rotor unit (36) easily.

It has been necessary to perform precise machining in order to form a fitting structure between the inner peripheral surface of the attachment portion opening (28) of the upper-end plate (26) and the frame (40) of the rotor unit (36) for positioning of the rotor unit (36) and the attachment portion opening (28), and has been necessary to attach the outflow pipe (32) to a predetermined position with respect to the attachment portion opening (28) from inside. However, in the water wheel (20) of this embodiment, the rotor unit (36) can be aligned with the outflow pipe (32) by the fitting of the runner cover (84). Thus, there is no need to perform precise machining in order to form the above-described fitting structure, which makes it possible to reduce the number of man-hours for manufacturing the water wheel (20).

In the water wheel (20) of this embodiment, the runner cover (84) functions as the support (90). The runner cover (84) serving also as the support (90) eliminates the need for the water wheel (20) to include the support (90) separate from the runner cover (84). This can reduce the number of components of the water wheel (20), and can simplify the configuration of the water wheel (20).

In the water wheel (20) of this embodiment, the sealing member (98) is interposed between the runner cover (84) and the outflow pipe (32) at a portion where these components (32, 84) are fitted to each other. It is thus possible to ensure watertightness at the joint portion between the runner cover (84) and the outflow pipe (32). This configuration can reduce water (FL) in the casing (22) flowing downstream, while bypassing the runner (72), through the gap at the joint portion between the runner cover (84) and the outflow pipe (32). Thus, a relatively large amount of water (FL) flows through the runner (72). This means that the energy of the water (FL) flowing through the casing (22) can be efficiently used to rotate the runner (72).

The interposition of the sealing member (98) between the portion where the runner cover (84) and the outflow pipe (32) are fitted to each other makes it possible to form a greater gap between the runner cover (84) and the outflow pipe (32) at the fitted portion, as compared to when a fitting structure without a sealing member (98) is used. It is thus possible to ensure watertightness at the joint portion between the runner cover (84) and the outflow pipe (32), and provide room for positioning the components (32, 84). In particular, when an O-ring is used as the sealing member (98), the runner cover (84) and the outflow pipe (32) are connected to each other, while being kept coaxial so as not to inhibit the flow of water (FL); at the same time, the lower flange (42) of the frame (40) and the upper-end plate (26), which are another joint portion, can be fixed to each other easily with ensured watertightness as a result of this connection between the runner cover (84) and the outflow pipe (32).

In the water wheel (20) of this embodiment, the runner (72) is attachable to and detachable from the rotor unit (36) detached from the casing (22). Moreover, the runner (72) can be attached to and detached from the rotor unit (36) without detaching any other components (37) of the rotor unit (36). This facilitates replacement of the runner (72).

In the water wheel (20) of this embodiment, the runner cover (84) is attachable to and detachable from the rotor unit (36) detached from the casing (22). Moreover, the runner cover (84) can be attached to and detached from the rotor unit (36) without detaching any other components (37) of the rotor unit (36). This facilitates replacement of the runner cover (84).

In the water wheel (20) of this embodiment, the runner cover (84) and the guide vane (56) are attachable to and detachable from the rotor unit (36) detached from the casing (22). The runner cover (84) and the guide vane (56) can be attached to and detached from the rotor unit (36) as a single unit without detaching any other components (37) of the rotor unit (36). This facilitates replacement of the guide vane (56).

In the water wheel (20) of this embodiment, the rotor unit (36) is attached to an upper portion of the casing (22). The rotor unit (36) vertically mounted on the casing (22) as described above can save space for installation of the water wheel (20).

In the hydraulic power generation device (8) of this embodiment, the components (37) of the rotor unit (36) of the water wheel (20) can be replaced easily. It is thus possible to improve the maintainability of the hydraulic power generation device (8).

In the hydraulic power generation system (1) of this embodiment, the components (37) of the rotor unit (36) of the water wheel (20) can be replaced easily. It is thus possible to replace the component (37) of the rotor unit (36) to accord with changes in the flow regimes (the flow rate (Q) of water (FL) and the total head (Ho)) in the flow path (4).

First Variation

Figure 8:
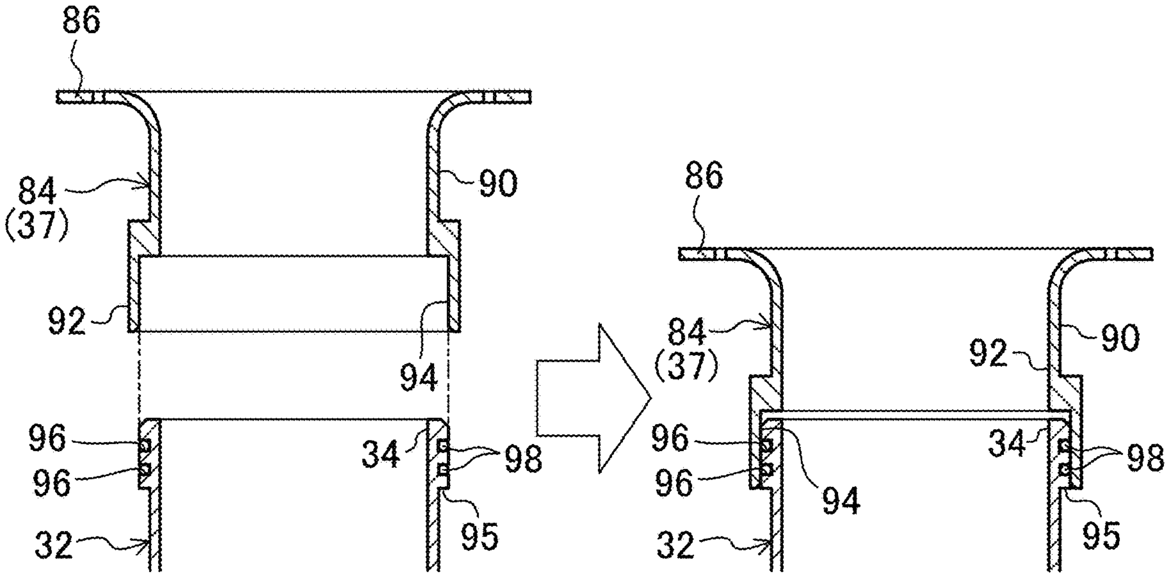
FIG. 8 is a cross-sectional view illustrating a structure of the joint between a runner cover and a pipe in a hydraulic power generation device according to a first variation.

As illustrated in FIG. 8, a water wheel (20) of a first variation includes two sealing members (98) attached to a fitting protrusion (95) of an outflow pipe (32). Specifically, the fitting protrusion (95) has two seal grooves (96). The two seal grooves (96) are spaced apart from each other in the longitudinal direction of the outflow pipe (32). The sealing members (98) are each fitted into a corresponding one of the two seal grooves (96). The sealing members (98) are interposed between an extension piece (92) of a runner cover (84) and the fitting protrusion (95) of the outflow pipe (32) to hermetically seal the gap between these components (32, 84).

Second Variation

Figure 9:
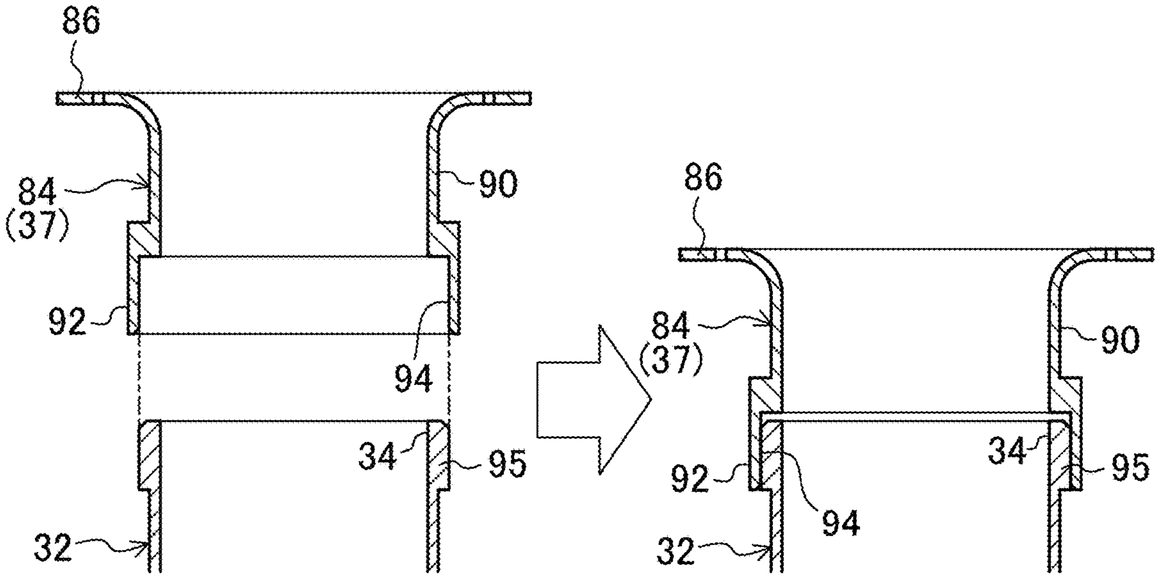
FIG. 9 is a cross-sectional view illustrating a structure of the joint between a runner cover and a pipe in a hydraulic power generation device according to a second variation.

As illustrated in FIG. 9, a water wheel (20) of a second variation includes no sealing member (98) attached to a fitting protrusion (95) of an outflow pipe (32). In this case, the fitting protrusion (95) has no seal groove (96). Between the extension piece (92) of the runner cover (84) and the fitting protrusion (95) of the outflow pipe (32), there is a section formed of only a slight gap large enough to enable attachment and detachment of the components (92, 95). The inner peripheral surface of the extension piece (92) of the runner cover (84) and the outer peripheral surface of the fitting protrusion (95) of the outflow pipe (32) may form a labyrinth seal. For example, the labyrinth seal has a structure in which a protrusion and a recess mesh with each other with a slight gap interposed therebetween.

Third Variation

Figure 10:
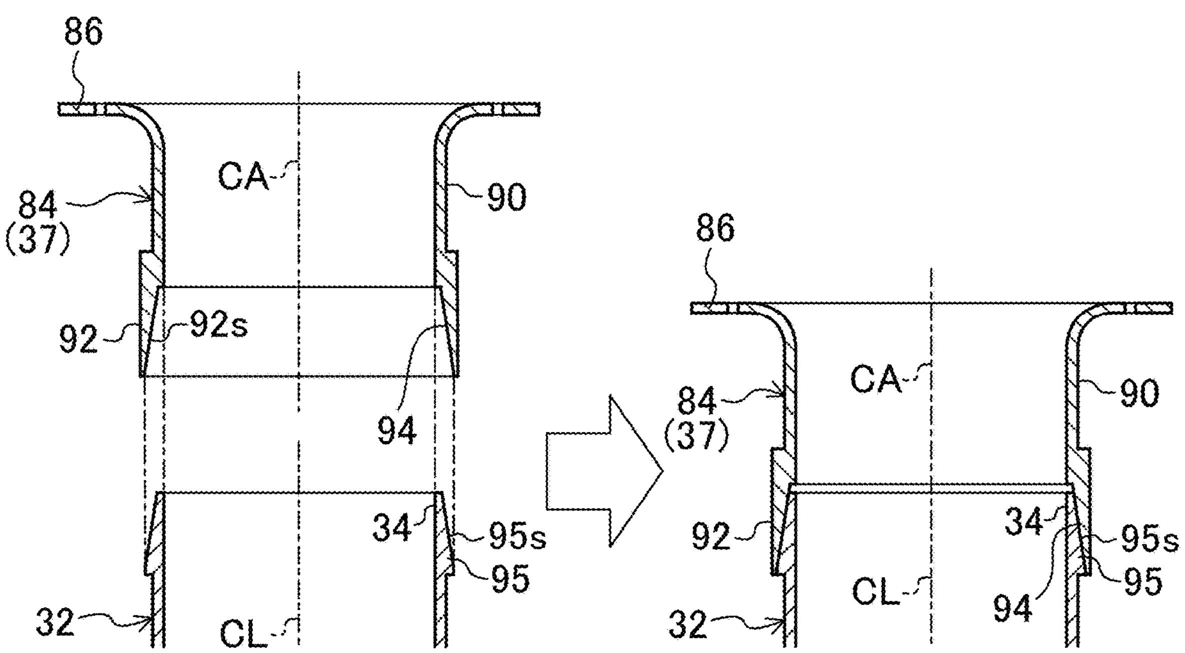
FIG. 10 is a cross-sectional view illustrating a structure of the joint between a runner cover and a pipe in a hydraulic power generation device according to a third variation.

As illustrated in FIG. 10, in a water wheel (20) of a third variation, a fitting protrusion (95) of an outflow pipe (32) and an extension piece (92) of a runner cover (84) are connected to each other so that their inclined surfaces (92*s*, 95*s*) inclined relative to the axis (CA) of the shaft (38) of a rotor unit (36) are butted together.

Specifically, the outer peripheral surface of the fitting protrusion (95) of the outflow pipe (32) forms the inclined surface (95*s*) inclined toward the periphery of the opening of the inflow end (34) relative to the axis (CA). The inner peripheral surface of the extension piece (92) of the runner cover (84) forms the inclined surface (92*s*) inclined toward the lower opening relative to the axis (CA). These two inclined surfaces (92*s*, 95*s*) form a guide shape for aligning the inflow end (34) of the outflow pipe (32) and the runner cover (84) with each other.

The shapes of the extension piece (92) of the runner cover (84) and the fitting protrusion (95) of the outflow pipe (32) in the third variation may be combined with those in the second variation. In other words, only one portion of the outer peripheral surface of the fitting protrusion (95) may form the inclined surface (95*s*), and only one portion of the inner peripheral surface of the extension piece (92) may form the inclined surface (92*s*). In this case, the inclined surface (95*s*) of the fitting protrusion (95) and the inclined surface (92) of the extension piece (92) are formed at portions corresponding to each other and are butted together.

Fourth Variation

Figure 11:
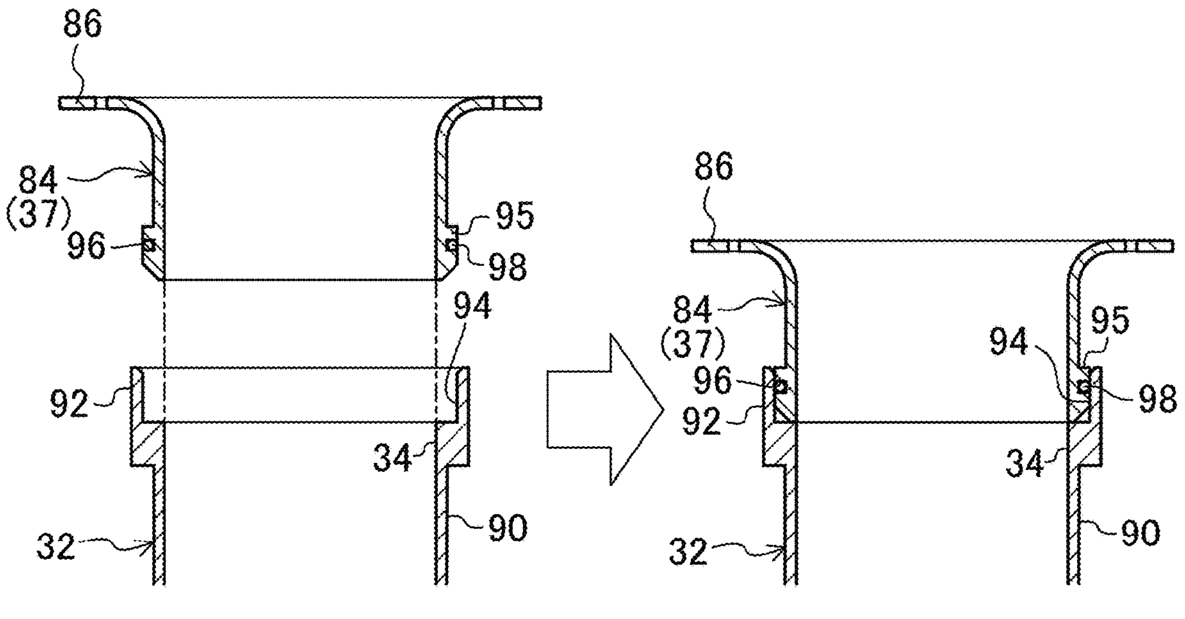
FIG. 11 is a cross-sectional view illustrating a structure of the joint between a runner cover and a pipe in a hydraulic power generation device according to a fourth variation.

As illustrated in FIG. 11, in a water wheel (20) of a fourth variation, a spigot structure to be used for aligning the outflow pipe (32) and the runner cover (84) includes a fitting recess (94) and a fitting protrusion (95) reversed with each other. In the water wheel (20) of this example, the outflow pipe (32) functions as a support (90).

Specifically, the inflow end (34) of the outflow pipe (32) has an extension piece (92). The extension piece (92) of this example has a cylindrical shape. The inside diameter and outside diameter of the extension piece (92) are slightly greater than the inside diameter and outside diameter of the body portion of the outflow pipe (32). The outflow pipe (32) has a fitting recess (94) on the inner surface of the extension piece (92). A lower end portion of the runner cover (84) is inserted into the fitting recess (94).

The lower end portion of the runner cover (84) has the fitting protrusion (95). The fitting protrusion (95) is a portion protruding outward from the periphery of the runner cover (84). The fitting recess (94) and the fitting protrusion (95) form a spigot structure that aligns the inflow end (34) of the outflow pipe (32) and the runner cover (84). The fitting protrusion (95) has a seal groove (96). A sealing member (98) is fitted into the seal groove (96).

The sealing member (98) is attached to the runner cover (84) in this manner. When the fitting protrusion (95) of the runner cover (84) is fitted into the fitting recess (94), the extension piece (92) of the outflow pipe (32) covers the sealing member (98) as well as the opening of the seal groove (96). The sealing member (98) is interposed between the extension piece (92) of the outflow pipe (32) and the fitting protrusion (95) of the runner cover (84) to hermetically seal the gap between these components (32, 84).

Fifth Variation

Figure 12:
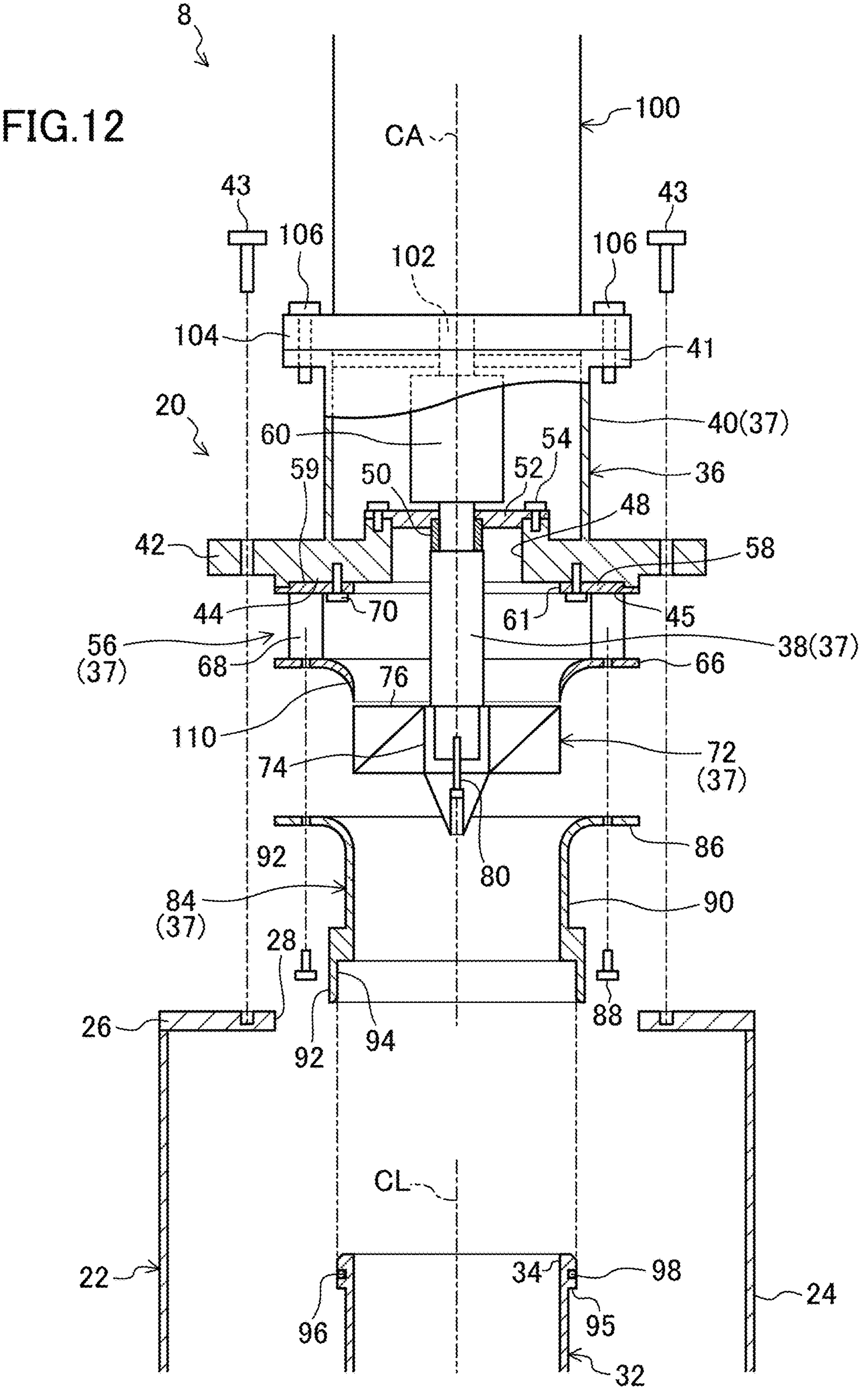
FIG. 12 is a cross-sectional view illustrating a hydraulic power generation device according to a fifth variation, in a disassembled state in which a rotor unit is detached from a casing, and a runner cover is detached from a guide vane.

As illustrated in FIG. 12, in a water wheel (20) of a fifth variation, a guide vane (56) and a runner cover (84) are aligned with each other by a fitting structure in which a portion of the guide vane (56) is fitted into the runner cover (84). An inner peripheral portion of an annular plate (66) of the guide vane (56) forms an annular projection (110) projecting toward the outer periphery of a runner (72). The outer peripheral surface of the projection (110) is shaped to follow a corresponding portion of the inner surface of the runner cover (84).

Sixth Variation

Figure 13:
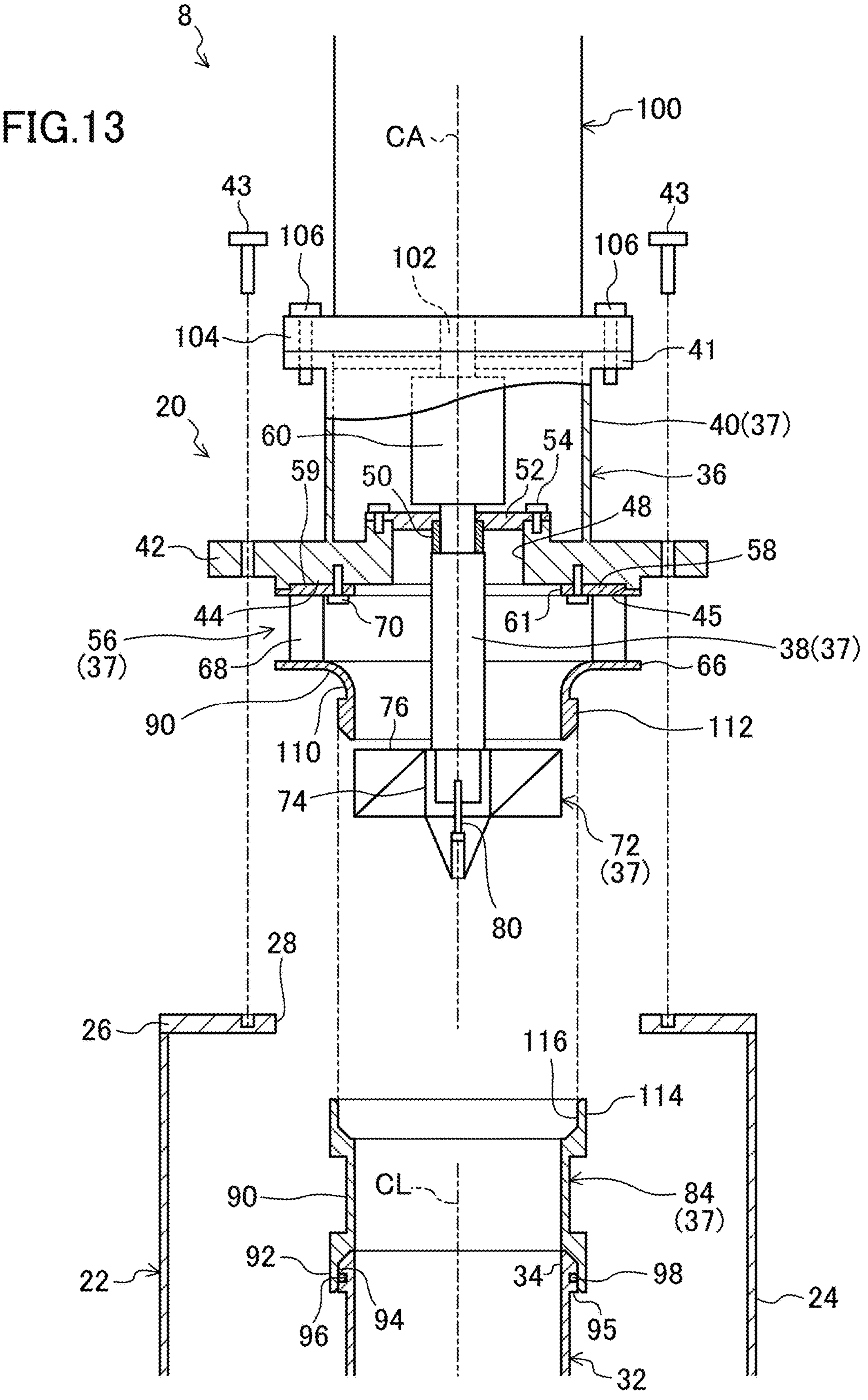
FIG. 13 is a cross-sectional view illustrating a hydraulic power generation device according to a sixth variation, in a disassembled state in which a rotor unit is detached from a casing.

As illustrated in FIG. 13, in a water wheel (20) of a sixth variation, a guide vane (56) and a runner cover (84) are aligned with each other by a spigot structure. Similarly to the fifth variation, an inner peripheral portion of an annular plate (66) of the guide vane (56) forms a projection (110). The projection (110) has a distal end portion with a fitting protrusion (112). The fitting protrusion (112) is a portion protruding outward from the periphery of the projection (110). The upper end of a runner cover (84) is provided with an extension piece (114). The extension piece (114) of this example has a cylindrical shape. The inside diameter and outside diameter of the extension piece (114) are slightly greater than the inside diameter and outside diameter of the body portion of the runner cover (84), respectively.

The runner cover (84) has a fitting recess (116) on the inner surface of the extension piece (114). The fitting protrusion (112) of the projection (110) of the guide vane (56) is inserted into the fitting recess (116). The guide vane (56) and the runner cover (84) are butted together and fitted to each other. The spigot structure for aligning the guide vane (56) and the runner cover (84) is a structure that makes the fitting recess (116) and the fitting protrusion (112) fitted to each other to a state in which the inner peripheral surface of the fitting recess (116) and the outer peripheral surface of the fitting protrusion (112) are butted together. The runner (72) is inserted deeper in the runner cover (84) (closer to the outflow pipe (32)) than the fitting protrusion (112) of the guide vane (56).

The runner (72) is located downstream, in the flow direction of water (FL), of the portion where the guide vane (56) and the runner cover (84) are fitted to each other. Thus, in the casing (22), the pressure difference of water (FL) between the inside and outside of the fitted portion is relatively low. This eliminates the need to provide a sealing member at the portion where the guide vane (56) and the runner cover (84) are fitted to each other. A sealing member may be provided at the portion where the guide vane (56) and the runner cover (84) are fitted to each other. The sealing member is interposed between the fitting protrusion (112) of the guide vane (56) and the extension piece (114) of the runner cover (84) to hermetically seal the gap between these components (112, 114).

In the water wheel (20) of this example, the guide vane (56) and the runner cover (84) are merely connected to each other by the fitting using the spigot structure described above, and are not fastened to each other. When the rotor unit (36) is detached from the casing (22), the runner cover (84) remains attached to the outflow pipe (32) and is left in the casing (22). The rotor unit (36) of this example does not include a runner cover (84). In the water wheel (20) of this example, the guide vane (56) and the runner cover (84) function as a support (90).

Seventh Variation

Figure 14:
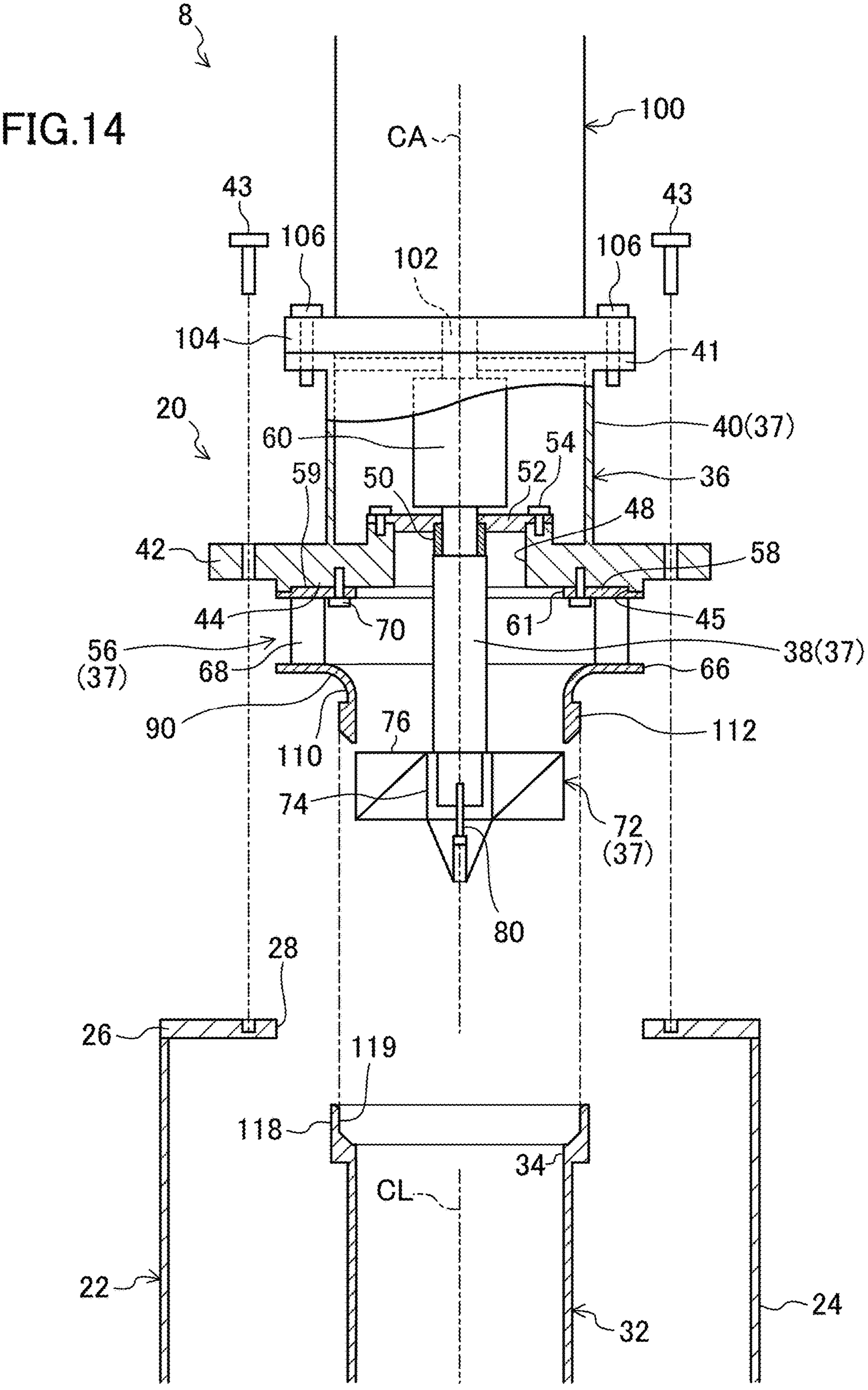
FIG. 14 is a cross-sectional view illustrating a hydraulic power generation device according to a seventh variation, in a disassembled state in which a rotor unit is detached from a casing.

As illustrated in FIG. 14, in a water wheel (20) of a seventh variation, a guide vane (56) is butted on the inflow end (34) of an outflow pipe (32) and is fitted to the inflow end (34). Similarly to the sixth variation, an inner peripheral portion of an annular plate (66) of the guide vane (56) forms a projection (110) with a fitting protrusion (112). The inflow end (34) of the outflow pipe (32) has an extension piece (118). The extension piece (118) of this example has a cylindrical shape. The inside diameter and outside diameter of the extension piece (118) are slightly greater than the inside diameter and outside diameter of the body portion of the outflow pipe (32), respectively.

The outflow pipe (32) has a fitting recess (119) on the inner surface of the extension piece (118). The fitting protrusion (112) of the projection (110) of the guide vane (56) is fitted into the fitting recess (119). The annular plate (66) of the guide vane (56) and the inflow end (34) of the outflow pipe (32) are aligned with each other by a spigot structure. The spigot structure is a structure that makes the fitting protrusion (112) of the annular plate (66) and the fitting recess (119) of the outflow pipe (32) fitted to each other to a state in which the outer peripheral surface of the fitting protrusion (112) and the inner peripheral surface of the fitting recess (119) are butted together. In the water wheel (20) of this example, the guide vane (56) functions as a support (90).

The runner (72) is located downstream, in the flow direction of water (FL), of the portion where the guide vane (56) and the outflow pipe (32) are fitted to each other. A sealing member does not have to be provided for the portion where the guide vane (56) and the outflow pipe (32) are fitted to each other because the pressure difference of water (FL) between the inside and outside of the fitted portion is relatively low. A sealing member may be provided at the portion where the guide vane (56) and the outflow pipe (32) are fitted to each other. The sealing member is interposed between the fitting protrusion (112) of the guide vane (56) and the extension piece (118) of the outflow pipe (84) to hermetically seal the gap between these components (112, 118).

Eighth Variation

Figure 15:
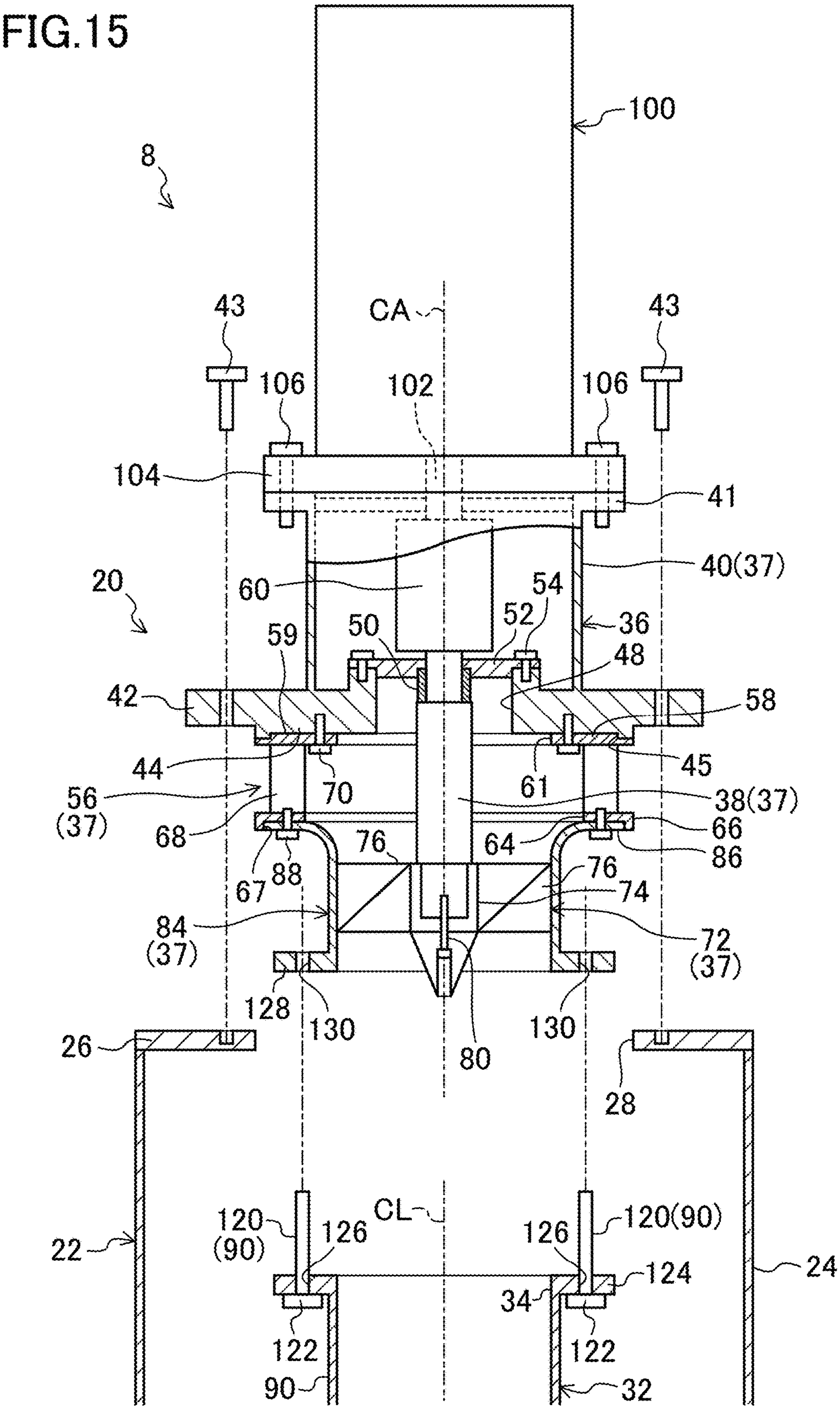
FIG. 15 is a cross-sectional view illustrating an essential portion of a hydraulic power generation device according to an eighth variation, in a disassembled state in which a rotor unit is detached from a casing.

As illustrated in FIG. 15, in a water wheel (20) of an eighth variation, two positioning pins (120) provided at the inflow end (34) of an outflow pipe (32) serve as a support (90). The positioning pins (120) of this example are weld bolts (122). The inflow end (34) of the outflow pipe (32) has a connection flange (124). The connection flange (124) is a portion extending outward from the periphery of the outflow pipe (32). The connection flange (124) has two insertion holes (126). The two insertion holes (126) are located at the inflow end (34) at portions opposite to each other.

The weld bolts (122) are inserted in the corresponding insertion holes (126) from below the connection flange (124) and are fixed to the connection flange (124). The weld bolts (122) extend upward from the connection flange (124). A portion of each weld bolt (122) located above the connection flange (124) constitutes a positioning pin (120). A lower end portion of the runner cover (84) has a connection flange (128). The connection flange (128) is a portion extending outward from outer periphery of the runner cover (84).

The connection flange (128) has positioning holes (130) at portions corresponding to the positioning pins (120). The positioning holes (130) pass through the connection flange (128). The outflow pipe (32) and the runner cover (84) are connected to each other with connection flanges (124, 128) butted together. The positioning pins (120) are inserted in the corresponding positioning holes (130). Thus, the rotor unit (36) is supported in alignment with the outflow pipe (32).

Ninth Variation

Figure 16:
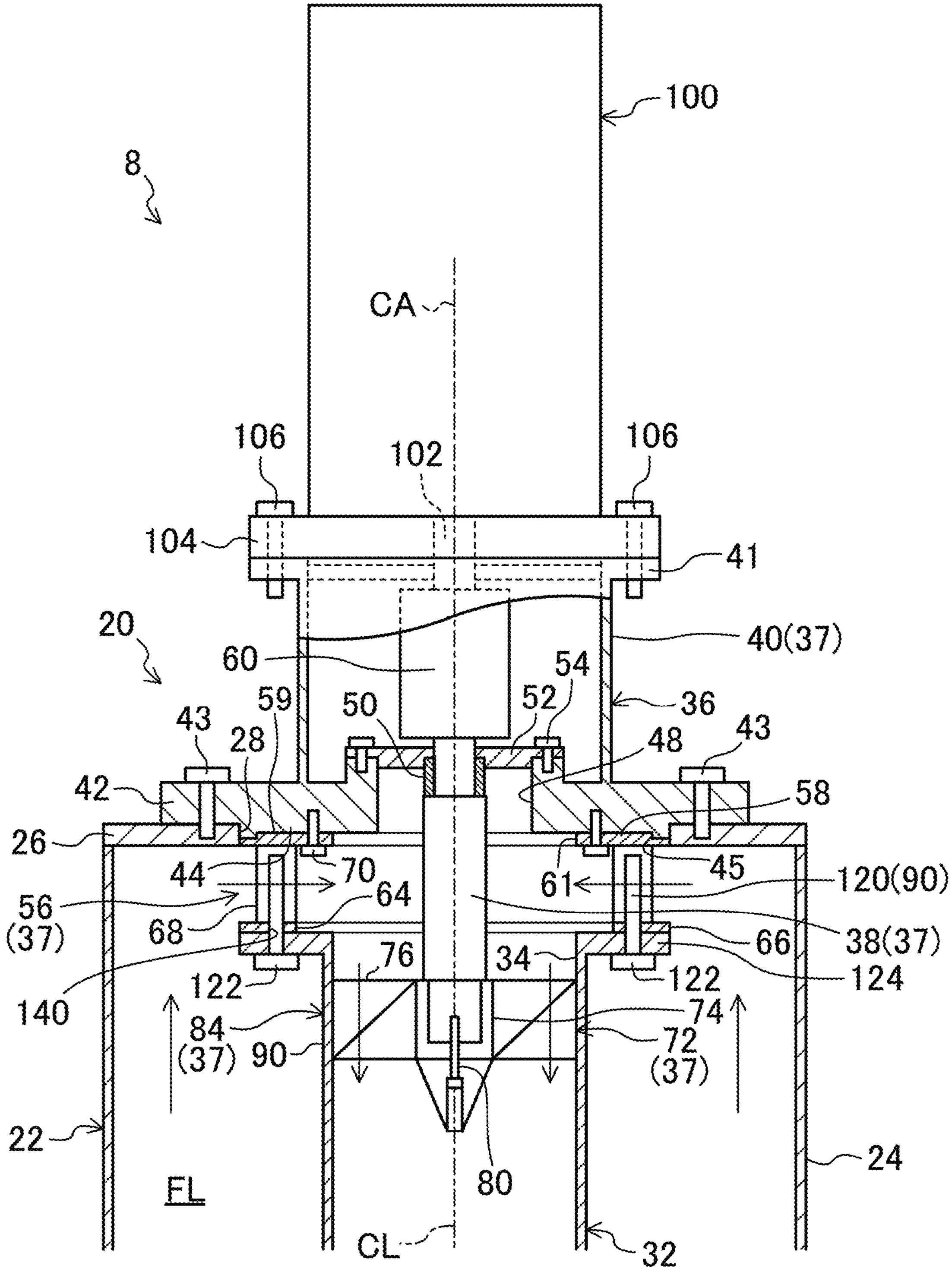
FIG. 16 is a cross-sectional view illustrating an essential portion of a hydraulic power generation device according to a ninth variation.

As illustrated in FIG. 16, in a water wheel (20) of a ninth variation, a rotor unit (36) does not include a runner cover (84). In the water wheel (20) of this example, similarly to the eighth variation, two positioning pins (120) provided at the inflow end (34) of an outflow pipe (32) serve as a support (90). The positioning pins (120) of this example are weld bolts (122).

The inflow end (34) of the outflow pipe (32) has a connection flange (124) similar to that of the eighth variation. Similarly to the eighth variation, the weld bolts (122) are fixed to the connection flange (124), and a portion extending upward from the connection flange (124) constitutes a positioning pin (120). An annular plate (66) of a guide vane (56) has positioning holes (140) at portions corresponding to the positioning pins (120). The positioning holes (140) pass through the annular plate (66).

The outflow pipe (32) and the guide vane (56) are connected to each other with the connection flange (124) and the annular plate (66) butted together. The positioning pins (120) are inserted in the corresponding positioning holes (140). Thus, the rotor unit (36) is supported in alignment with the outflow pipe (32). In the water wheel (20) of this example, a runner (72) is disposed inside the outflow pipe (32). The outflow pipe (32) houses the runner (72) rotatably. A predetermined gap is formed between the inner peripheral surface of the outflow pipe (32) and the runner (72) (strictly speaking, the runner vane (76)).

Other Embodiments

The foregoing embodiment may be modified as follows.

Figure 17:
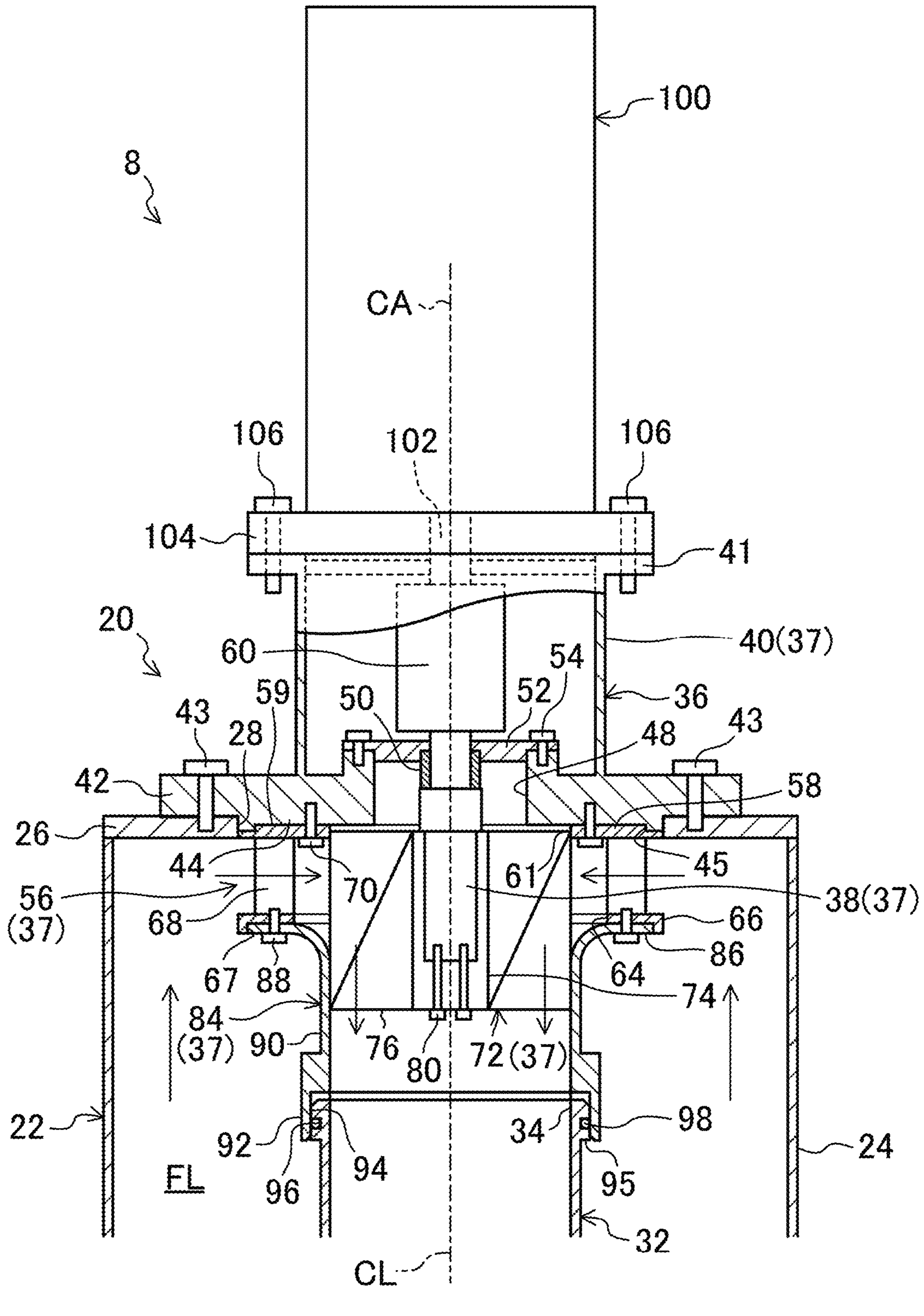
FIG. 17 is a cross-sectional view illustrating an essential portion of a hydraulic power generation device according to another embodiment.

In the foregoing embodiment, the runner (72) is of an axial-flow type, but is not limited thereto. The runner (72) may be of a diagonal-flow type or a radial-flow type. In this case, as illustrated in FIG. 17, part of the runner (72) is located inside the guide vane (56), specifically, surrounded by a plurality of blades (68).

Figure 18:
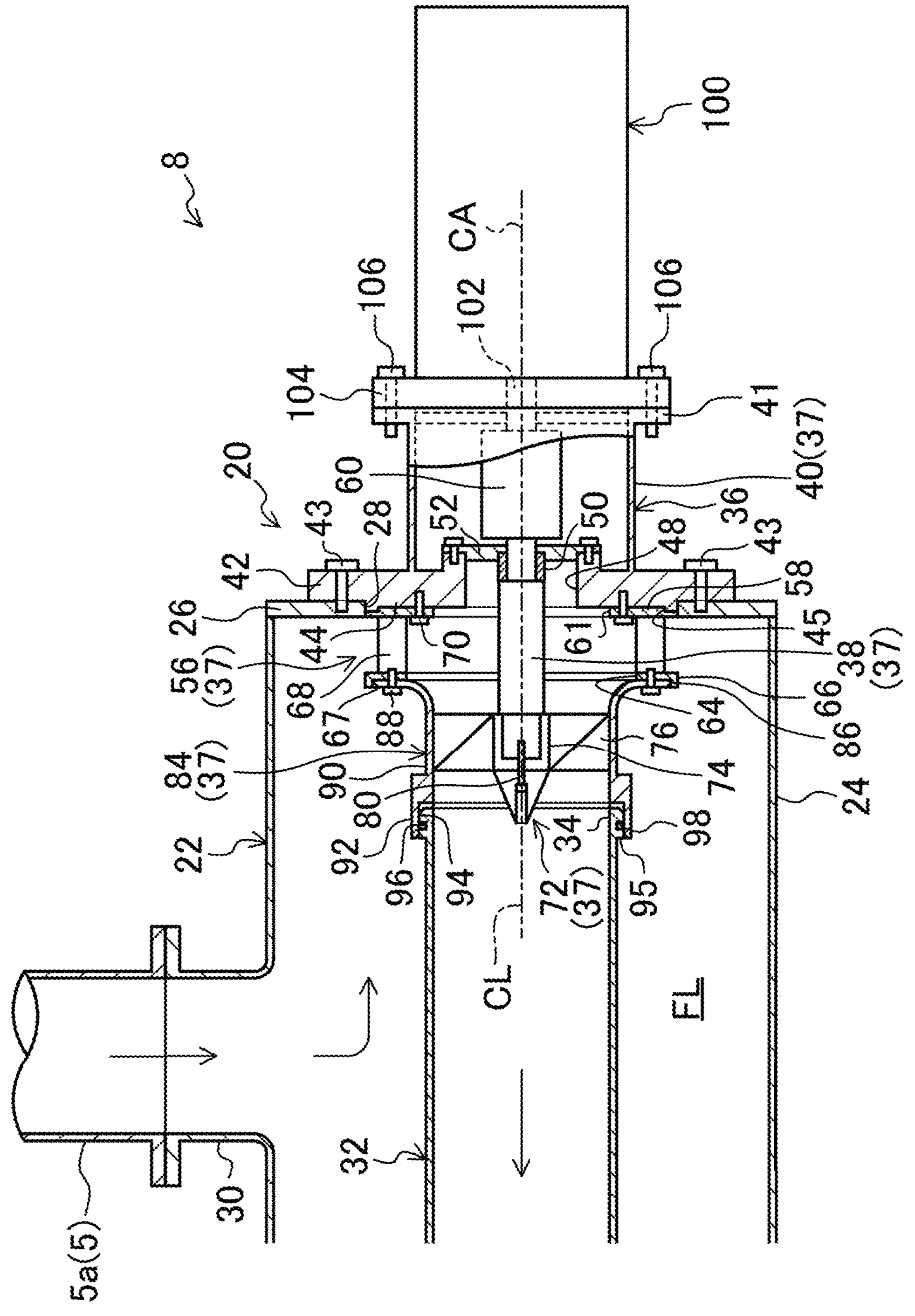
FIG. 18 is a cross-sectional view illustrating a schematic configuration of a hydraulic power generation device according to another embodiment.
Figure 19:
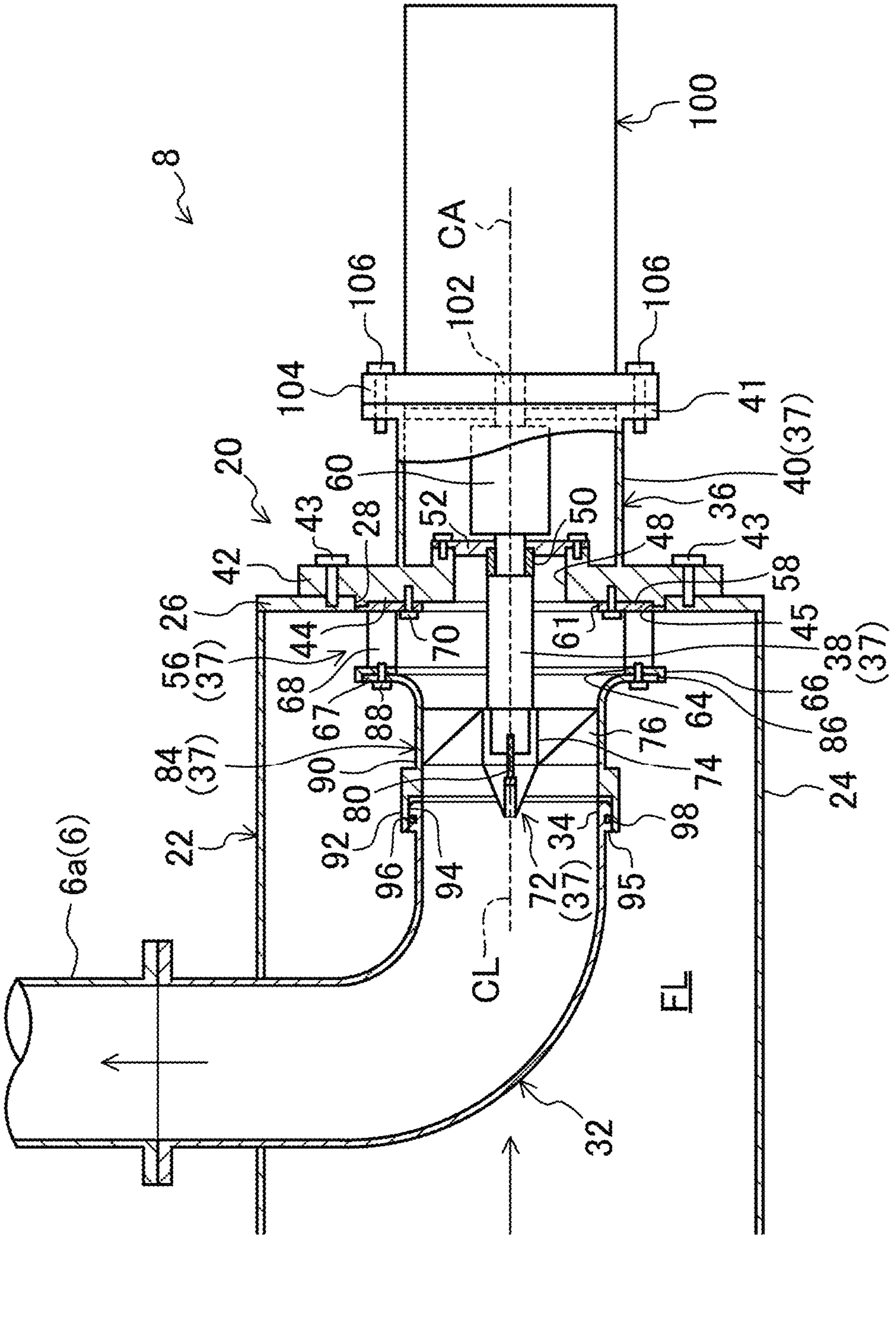
FIG. 19 is a cross-sectional view illustrating a schematic configuration of a hydraulic power generation device according to another embodiment.

In the foregoing embodiment, the hydraulic power generation device (8) is vertically mounted, but is not limited thereto. As illustrated in FIGS. 18 and 19, the hydraulic power generation device (8) may be horizontally mounted such that the water wheel (20) and the generator (100) are arranged in a horizontal direction. The water wheel (20) and the generator (100) are disposed so that their shafts (38, 102) extend in the horizontal direction. The casing (22) lies sideways such that its centerline extends in the horizontal direction. The inflow pipe (30) and the outflow pipe (32) may be connected to the casing (22) in any way. The outflow pipe (32) may extend straight inside the casing (22) (see FIG. 18). The outflow pipe (32) may be bent inside the casing (22) (see FIG. 19).

In the water wheel (20) of the above embodiment, the structure in which the protruding portion (44) of the frame (40) is located in the attachment portion opening (28) of the upper-end plate (26) may be used as a fitting structure that determines the position of the frame (40) relative to the upper-end plate (26) to ensure the accuracy of the positioning between the frame (40) and the upper-end plate (26).

In the eighth variation and the ninth variation, two positioning pins (120) serve as a support (90), but the support (90) is not limited thereto. The number of the positioning pins (120) may be one, or may be three or more. Further, the weld bolts (122) are used as the positioning pins (120), but the positioning pins (120) are not limited thereto. Each of the positioning pins (120) may be another member having a rod-like portion that extends in a direction along the shaft (38) of the rotor unit (36), such as a stud bolt.

In the foregoing embodiment, the shape of the extension piece (92) of the runner cover (84) is cylindrical, but is not limited thereto. For example, the extension piece (92) may be divided in the circumferential direction by a plurality of slits in employing a structure in which the sealing member (98) is not provided between the extension piece (92) of the runner cover (84) and the fitting protrusion (95) of the outflow pipe (32). In other words, the extension piece (92) may be configured as a plurality of small plates placed so as to surround the inflow end (34) of the outflow pipe (32).

In the foregoing embodiment, the runner cover (84) functions as the support (90) to support the rotor unit (36) on the outflow pipe (32), but is not limited thereto. The support (90) may be a member other than the runner cover (84) or the positioning pin (120) and can be embodied in any form, as long as the support (90) can support the rotor unit (36) at a predetermined position relative to the outflow pipe (32) when the rotor unit (36) is attached to the casing (22).

In the foregoing embodiment, an example has been described in which the hydraulic power generation system (1) is applied to the water supply system (2), but not limited thereto. The hydraulic power generation system (1) may be applied to other flow path facilities, such as those for a sewer system, industrial water, rivers, discharge, or agricultural water.

While the embodiment and variations thereof have been described above, it will be understood that various changes in form and details may be made without departing from the spirit and scope of the claims. The foregoing embodiments and variations thereof may be combined and replaced with each other without deteriorating the intended functions of the present disclosure.

As can be seen from the foregoing description, the present disclosure is useful for a water wheel, a hydraulic power generation device, and a hydraulic power generation system.

The invention claimed is:

1. A water wheel comprising:

a casing configured to carry a fluid flow through an inside thereof, the casing including an attachment portion having an attachment portion opening;

a pipe extending in the inside of the casing and having an open end disposed in the inside of the casing, the open end being spaced from and facing the attachment portion opening;

a rotor unit having a shaft configured to be inserted in the inside of the casing, the shaft being directed toward the pipe, the rotor unit including a runner fixed to a portion of the shaft located in the inside of the casing and a runner cover located on an outer periphery of the runner, and the rotor unit being detachably attached to the casing from outside the casing after the shaft, the runner, and the runner cover are inserted into the inside of the casing through the attachment portion opening; and an extension piece being provided on one of an end of the runner cover on a side facing the open end of the pipe and the open end of the pipe;

when the rotor unit is attached to the casing, the runner cover and the open end of the pipe being fitted to each other via the extension piece, whereby the runner cover and the open end of the pipe are releasably coupled, and the rotor unit being supported at a predetermined position relative to the pipe, and the rotor unit not being fastened to another component, including the pipe, in the inside of the casing with a fastener.

2. The water wheel of claim 1, wherein the rotor unit further includes a guide vane disposed opposite to the pipe with respect to the runner cover, and the guide vane is configured to guide the fluid in the casing to the runner.

3. The water wheel of claim 2, wherein the runner cover supports the rotor unit at the predetermined position relative to the pipe when the rotor unit is attached to the casing.

4. The water wheel of claim 3, wherein the runner cover and the pipe are butted together and fitted to each other, and a sealing member is provided at a portion where the runner cover and the pipe are fitted to each other, and the sealing member is being interposed between the runner cover and the pipe.

5. The water wheel of claim 4, wherein the rotor unit includes a combination of a plurality of components including the shaft, and the rotor unit is configured such that one or some of the plurality of components are attachable and detachable to and from the rotor unit without detaching any other of the plurality components.

6. The water wheel of claim 2, wherein the rotor unit includes a combination of a plurality of components including the shaft, and the rotor unit is configured such that one or some of the plurality of components are attachable and detachable to and from the rotor unit without detaching any other of the plurality of components.

7. The water wheel of claim 3, wherein the rotor unit includes a combination of a plurality of components including the shaft, and the rotor unit is configured such that one or some of the plurality of components are attachable and detachable to and from the rotor unit without detaching any other of the plurality of components.

8. The water wheel of claim 1, wherein the runner cover supports the rotor unit at the predetermined position relative to the pipe when the rotor unit is attached to the casing.

9. The water wheel of claim 8, wherein the runner cover and the pipe are butted together and fitted to each other, and a sealing member is provided at a portion where the runner cover and the pipe are fitted to each other, and the sealing member is interposed between the runner cover and the pipe.

10. The water wheel of claim 9, wherein the rotor unit includes a combination of a plurality of components including the shaft, and the rotor unit is configured such that one or some of the plurality of components are attachable and detachable to and from the rotor unit without detaching any other of the plurality of components.

11. The water wheel of claim 8, wherein the rotor unit includes a combination of a plurality of components including the shaft, and the rotor unit is configured such that one or some of the plurality of components are attachable and detachable to and from the rotor unit without detaching any other of the plurality of components.

12. The water wheel of claim 1, wherein the rotor unit includes a combination of a plurality of components including the shaft, and the rotor unit is configured such that one or some of the plurality of components are attachable and detachable to and from the rotor unit without detaching any other of the plurality of components.

13. The water wheel of claim 1, wherein the rotor unit is attached to an upper portion of the casing with the shaft extending in a vertical direction.

14. A hydraulic power generation device including the water wheel of claim 1, the hydraulic power generation device further comprising:

a generator configured to be driven by the water wheel.

15. A hydraulic power generation system including the hydraulic power generation device of claim 14, the hydraulic power generation system further comprising:

a flow path through which fluid flows, the hydraulic power generation device being employed in the flow path.

* * * * *